(12) United States Patent
Nakamura et al.

(10) Patent No.: US 7,965,594 B2
(45) Date of Patent: Jun. 21, 2011

(54) OPTICAL PICKUP AND OPTICAL DISC APPARATUS

(75) Inventors: Toshiteru Nakamura, Yokohama (JP); Shigeharu Kimura, Yokohama (JP); Kunikazu Ohnishi, Yokosuka (JP); Toshio Sugiyama, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/826,827

(22) Filed: Jun. 30, 2010

(65) Prior Publication Data
US 2010/0322047 A1 Dec. 23, 2010

Related U.S. Application Data

(63) Continuation of application No. 11/734,817, filed on Apr. 13, 2007.

(30) Foreign Application Priority Data

Apr. 17, 2006 (JP) .................................. 2006-112893
Feb. 9, 2007 (JP) .................................. 2007-029929

(51) Int. Cl.
*G11B 7/00* (2006.01)
(52) U.S. Cl. ............... 369/44.37; 369/44.24; 369/44.41; 369/44.23
(58) Field of Classification Search ............... 369/44.23, 369/44.37, 44.41, 112.01, 112.05, 112.07, 369/44.24, 108
See application file for complete search history.

(56) References Cited

U.S. PATENT DOCUMENTS

| | | | |
|---|---|---|---|
| 6,104,689 A * | 8/2000 | Noguchi ................... | 369/44.23 |
| 6,400,664 B1 | 6/2002 | Shimano et al. | |
| 6,438,091 B2 | 8/2002 | Nagata et al. | |
| 7,064,898 B1 | 6/2006 | Takasuka | |
| 7,164,632 B2 | 1/2007 | Miyake | |
| 7,227,819 B2 * | 6/2007 | Kadowaki et al. ........ | 369/44.41 |
| 7,298,676 B2 | 11/2007 | Hwang et al. | |
| 2005/0036432 A1 | 2/2005 | Kim et al. | |
| 2005/0161579 A1 | 7/2005 | Kim et al. | |
| 2005/0199778 A1 | 9/2005 | Kadowaki | |
| 2008/0310283 A1 | 12/2008 | De Wit et al. | |

FOREIGN PATENT DOCUMENTS

| | | |
|---|---|---|
| CN | 1390351 | 1/2003 |
| CN | 1485828 | 3/2004 |
| JP | 07-272303 | 10/1995 |
| JP | 2004-281026 | 10/2004 |
| JP | 2004-334949 | 11/2004 |
| JP | 2005-203090 | 7/2005 |
| WO | WO 2007/007274 | 1/2007 |

OTHER PUBLICATIONS

U.S. Appl. No. 11/734,817, filed Apr. 13, 2007, Toshiteru Nakamura, et al., Hitachi Media Electronics Co., Ltd.

* cited by examiner

*Primary Examiner* — Thang V Tran
(74) *Attorney, Agent, or Firm* — Antonelli, Terry, Stout & Kraus, LLP.

(57) ABSTRACT

When recording/reproducing an optical disc having a recording layer of multi-layer structure, an unwanted optical beam reflected from a recording layer other than a target layer for recording/reproduction is incident on a photodetector to cause an unwanted disturbance component to leak to a detection signal, giving rise to a degradation in the quality of a tracking control signal. In an optical pickup apparatus, for suppression of the degradation, an optical element is mounted having a diffraction area for diffracting part of the optical beam and light receiving planes for sub-optical beams are provided each of which has a light shielding zone or dead zone of a predetermined width on its central sectioning line.

8 Claims, 22 Drawing Sheets

FIG.14A
FIG.14B
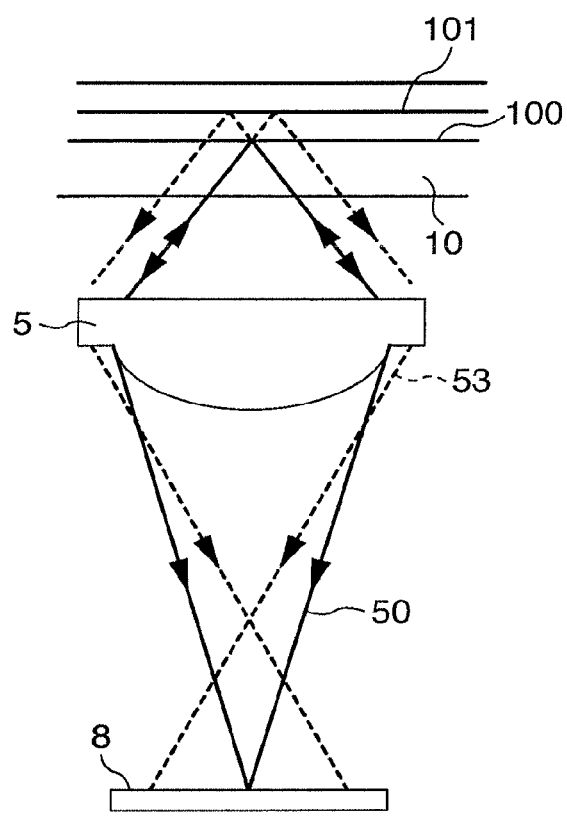
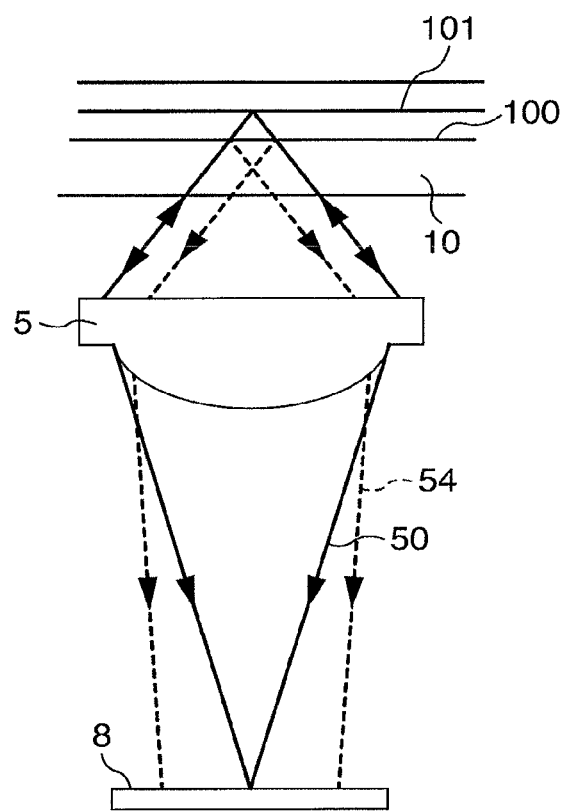

OPTICAL PICKUP AND OPTICAL DISC APPARATUS

CLAIM OF PRIORITY

This application is a continuation of application Ser. No. 11/734,817, filed on Apr. 13, 2007, now pending, which claims the benefit of Japanese Application Nos. JP2006-112893 filed on Apr. 17, 2006 and JP2007-029929 filed on Feb. 9, 2007 in the Japanese Patent Office, the disclosures of which are incorporated herein by reference.

BACKGROUND OF THE INVENTION

The present invention relates to an optical pickup and an optical disc apparatus mounting the same and an optical information recording and reproducing apparatus as well.

As a background art concerning the present technology, JP-A-7-272303 (Patent Document 1), for example, is available. The public literature describes an object reading "providing an optical disc apparatus and an optical pickup which can make the overall size compact and simplify the assembling work by virtue of a simplified construction and a method of assembling the optical pickup as well" and describes a solution reading "addition of output signals from light receiving planes E and G and addition of output signals from light receiving planes F and H are precedently carried out in advance amplification circuits 15E and 15H and the resulting sum signals are amplified and delivered".

Further, available as another background art concerning the field of the present technology is, for example, JP-A-2005-203090 (Patent Document 2). The public literature describes an object reading "providing an optical pickup apparatus which can suppress, during recording and/or reproduction of an optical disc having a plurality of recording layers on one side surface, interference light caused by adjoining layers to thereby eliminate fluctuations in a tracking error signal detected through DPP (difference push-pull) and describes a solution reading "an optical member is provided which can, when applied to an optical information storage medium having a plurality of recording layers on at least one surface, restrain interference light caused by adjoining layers from being received by a photodetector. Through this, the interference light due to adjoining layers can be restrained from being received by the photodetector, especially, by first and second sub-detectors of the photodetector.

SUMMARY OF THE INVENTION

As a contrivance for realizing a large capacity of optical disc recording, a technology concerning an optical information recording medium having a recording layer of multi-layer structure (hereinafter, simply referred to as an optical disc) has recently been developed.

Further, so-called tracking control is used for focusing a laser beam stably and accurately on a predetermined recording track formed on the recording layer of the optical disc. Then, as a tracking control signal detection scheme, the differential push-pull scheme (DPP scheme) generally comes up.

Recently, in the course of recording/reproduction of an optical disc having a recording layer of multi-layer structure, a problem that the tracking control signal detected through the DPP scheme changes owing to interlayer cross talk has been raised.

From the standpoint of geometrical optics, the solution described in Patent Document 2 succeeds in suppressing the change in the through the DPP scheme detected tracking control signal attributable to the interlayer cross talk at the time of recording/reproduction of the optical disc having a recording layer of multi-layer structure. But, in spite of the fact that the solution described in Patent Document 2 is effective to keep unwanted light from the adjoining layer from landing on the photodetector, an interlayer cross talk still occurs in effect, raising a problem that generation of a highly accurate and stable tracking control signal is difficult to achieve.

An object of the present invention is to provide an optical pickup and an optical information recording/reproduction apparatus which can operate stably and highly precisely even for a recording medium having a recording layer of multi-layer structure.

Another object of this invention is to provide an optical pickup apparatus and an optical disc apparatus which can obtain a highly accurate and stable tracking control signal.

The above objects can be accomplished by the constitution as recited in appended claims.

According to the present invention, stable and highly precise optical pickup and optical information recording/reproduction apparatus can be provided.

In addition, according to the present invention, optical pickup apparatus and optical disc apparatus capable of obtaining a highly accurate and stable tracking control signal can be provided.

Other objects, features and advantages of the invention will become apparent from the following description of the embodiments of the invention taken in conjunction with the accompanying drawings.

BRIEF DESCRIPTION OF THE DRAWINGS

FIGS. 14A and 14B are schematic sectional diagrams showing optical paths of optical beams incident on an optical disc of multi-layer structure, respectively.

DESCRIPTION OF THE EMBODIMENTS

Figure 1:
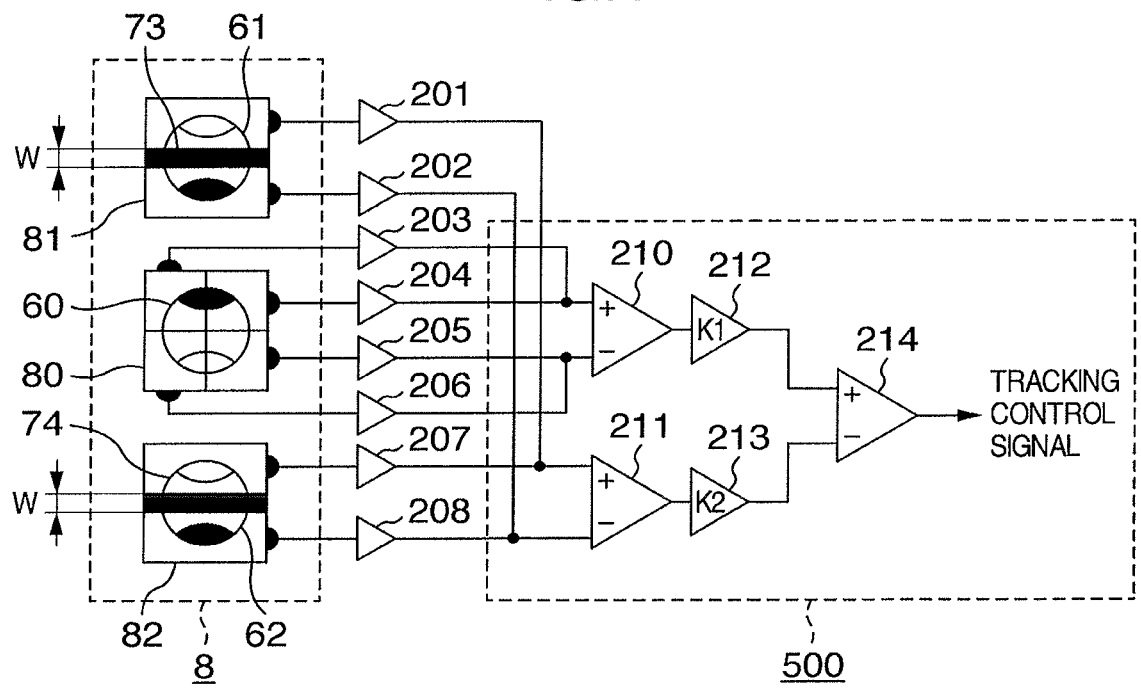
FIG. 1 is a schematic plan view diagram showing a photodetector representing a main part in a first embodiment.

Details of embodiments of the present invention will be described hereunder with reference to the accompanying drawings. It will be appreciated that in individual drawings, like constituent components functioning identically are designated by like reference numerals.

Embodiment 1

The DPP scheme will be described in brief.

Figure 2:
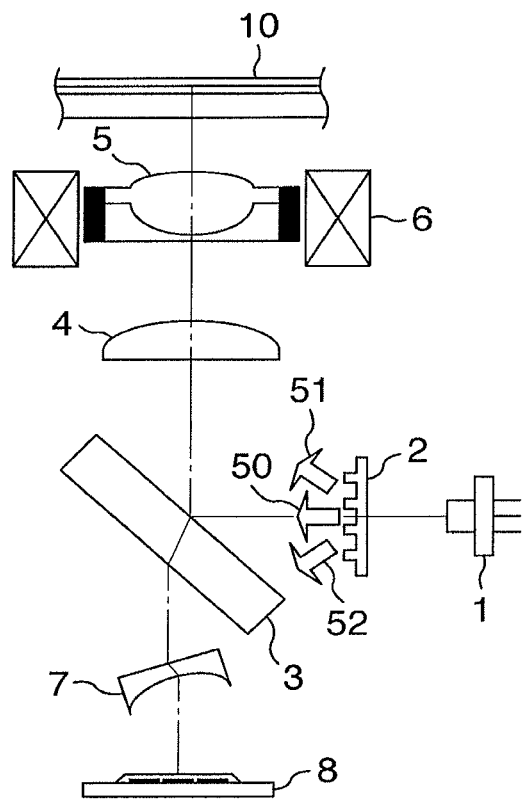
FIG. 2 is a schematic front view diagram showing an optical system configuration of an optical pickup in the conventional technologies and in the present invention.

Referring to FIG. 2, a main optical system of an optical pickup using a tracking control signal detection means based on the DPP scheme is configured as schematically illustrated therein.

A laser beam generated from a semiconductor laser 1 is split by a beam splitting element such as diffraction grating 2 into a main optical beam 50 (o-th order) for actual reproduction or recording of an information signal and two sub-optical beams 51 and 52 (positive and negative first order diffracted beams). These optical beams travel through half mirror 3 and collimate lens 4 and they are focused independently on a predetermined recording layer inside an optical disc 10 by means of an objective lens 5. At that time, a focused spot of main optical beam 50 (not shown) and focused spots of sub-optical beams 51 and 52 (not shown) are irradiated on the optical disc 10 at such positions that they are spaced apart in the radial direction of the optical disc 10 at intervals equal to substantially half the recording track spacing of the optical disc 10. Then, these focused light spots are reflected by the optical disc 10 to generate reflection optical beams which return through the objective lens 5, collimate lens 4 and half mirror 3 and then land on a photodetector 8 by way of a detection lens 7.

The objective lens 5 is attached with an actuator 6 for driving the same in a predetermined direction and a tracking control signal to be described later is fed back to the actuator 6 to control the position of the objective lens, thus executing tracking control.

Figure 3:
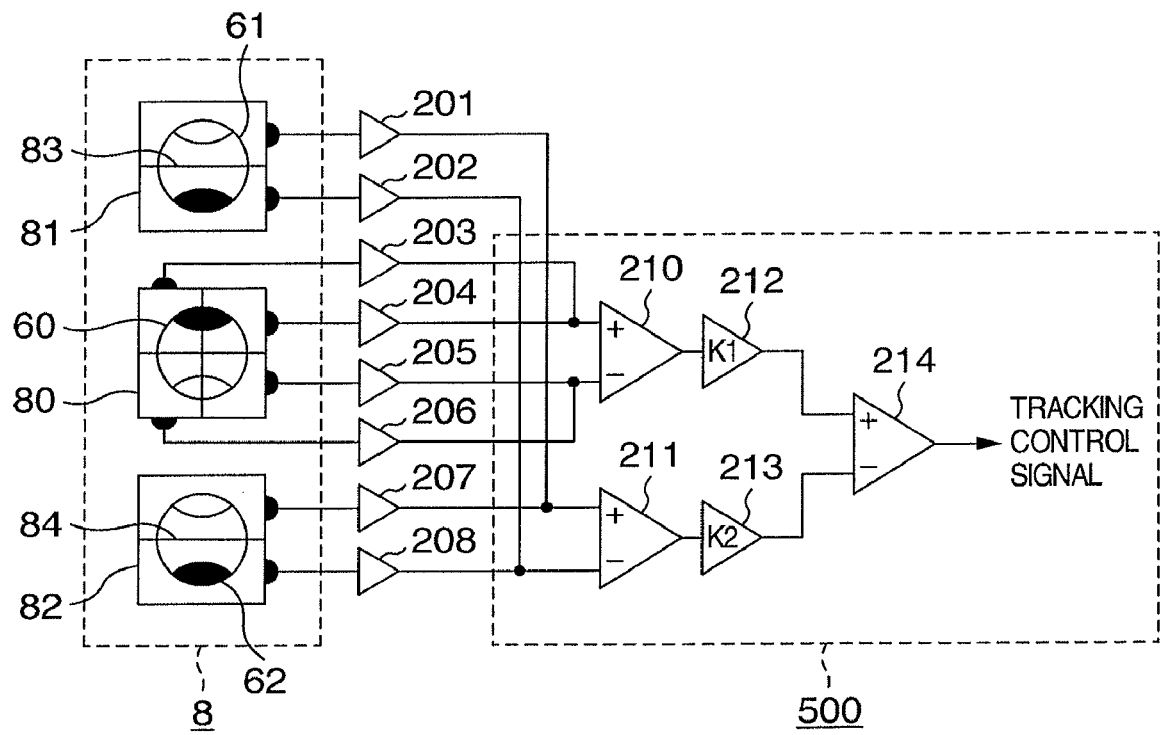
FIG. 3 is a schematic plan view diagram showing a conventional example of photodetector.

Incidentally, the photodetector 8 includes, as shown in FIG. 3, a light receiving area 80 on which a focused spot 60 originating from the optical disc reflected light of main optical beam 50 is incident and light receiving areas 81 and 82 on which light spots 61 and 62 originating from the optical disc reflected light of sub-optical beams 51 and 52, respectively, are incident, the areas 81 and 82 being disposed in parallel above and below the area 80 on the sheet of drawing. Of these areas, the light receiving area 80 for optical beam 50 forms, for example, a light receiving plane divided into four divisional areas by a cruciform sectioning line as shown in the figure and on the other hand, each of the light receiving areas 81 and 82 for sub-optical beams forms a light receiving plane which is halved vertically in the figure by a sectioning line 83 or 84. Then, currents are generated from the individual divisional light receiving planes in accordance with intensities of light incident thereon and these currents are converted into voltages independently of one another by means of current-voltage conversion amplifiers 201 to 208 and mutually subtracted by means of subtractors 210 to 211 so that a push-pull signal of the main optical beam 50 (for simplicity of description, referred to as a main PP signal) and a sum signal of push-pull signals of the respective sub-optical beams 51 and 52 (for simplicity of description, referred to as a sub-PP signal) may be outputted.

Since the respective focused spots incident on the optical disc 10 are arrayed as described above, the main PP signal and the sub-PP signal now delivered are 180° dephased with each other. Therefore, it is so contrived that by amplifying the both types of PP signals with suitable mu-factors K1 and K2 by means of amplifiers 212 and 213, respectively, and thereafter subtracting them from each other by means of a subtractor 214, an excellent tracking control signal can be outputted which is removed of unwanted DC components and in-phase disturbance components contained in both the main PP signal and sub-PP signal.

As will be seen from the above, the DPP scheme has an advantage that an offset or the like of tracking control signal caused concomitantly with, for example, a tracking displacement of the objective lens can be eliminated with the simplified optical system configuration and a tracking control signal of high quality can be detected stably, thus enjoying a widespread use for a tracking control signal detection means. An operation circuit constructed of subtractors 210 and 211, amplifiers 212 and 213 and subtractor 214 to detect the tracking control signal as described above will hereinafter be termed a tracking control signal detection circuit 500.

Controlling the position of objective lens 5 in optical pickup is not limited to only the aforementioned tracking control but obviously, position control along the optical axis direction, so-called focus control, is performed concurrently. Then, for detection of a focus control signal used in the focus control, an astigmatism scheme, for example, is used in general and like the tracking control signal, the focus control signal can be generated from signals detected at the individual light receiving planes of the photodetector 8 shown in FIG. 3, for example, by way of a predetermined operation circuit.

In this manner, the DPP scheme has been used widely.

But when the tracking control signal detection means based on the DPP scheme as above is used for an optical pickup or optical information recording/reproduction apparatus adapted to reproduce or record an optical disc having a recording layer of multi-layer structure, the following problem arises newly.

More particularly, when respective optical beams are focused on a recording layer undergoing actual recording or reproduction of a signal (hereinafter simply referred to as a target layer) among the individual recording layers in the multi-layer optical disc, part of the quantity of light is not reflected at the target layer but is reflected by a recording layer other than the target layer, disadvantageously resulting in an unwanted optical beam failing to contribute to actual signal detection, which unwanted optical beam traces substantially the same optical path as that of the essential signal beam to land on the individual light receiving planes in the photodetector. The unwanted optical beam thus being incident on the light receiving plane interferes with the essential signal beam on the light receiving plane to form an interference fringe by which the quantity of light is unbalanced to cause an unwanted disturbance component to leak to the signal delivered out of each of the light receiving planes.

Figure 4:
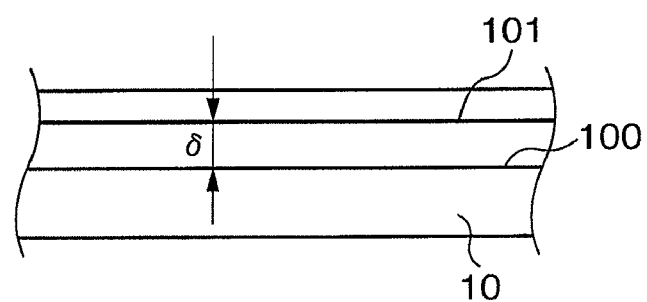
FIG. 4 is a schematic sectional diagram of an optical disc having a multi-layer structure.

This phenomenon will be described concretely by taking an optical disc 10 having a recording layer structure of two layers 100 and 101 (layer spacing δ) as shown in FIG. 4, for instance.

On the optical disc 10 having the two recording layers 100 and 101 as shown in FIG. 4, a main optical beam 50 and sub-optical beams 51 and 52 (not shown) are focused from below in the figure as schematically illustrated, for example, in FIGS. 5A and 5B.

Figure 5A:
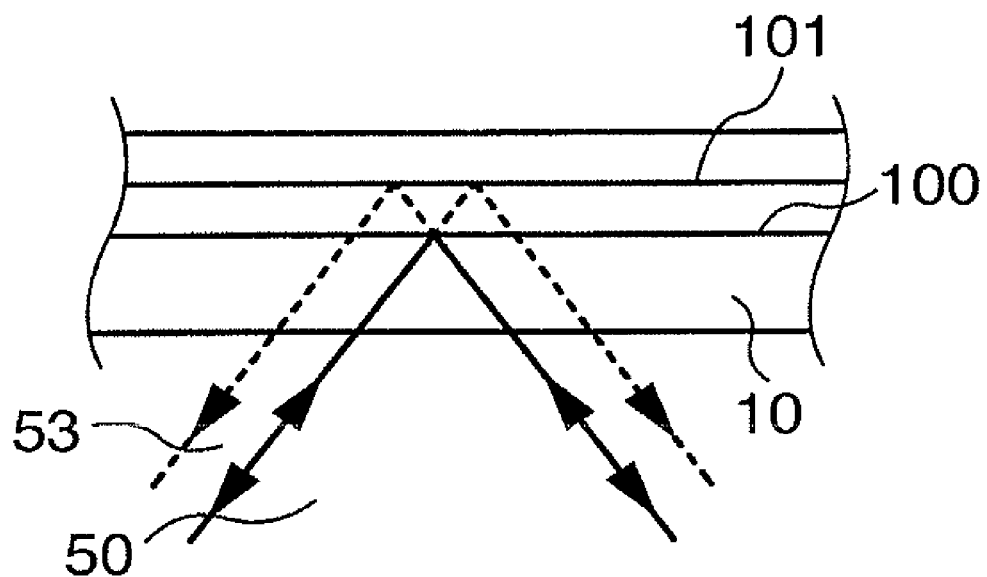
FIGS. 5A and 5B are schematic sectional diagrams showing optical paths of optical beams incident on the multi-layer optical disc, respectively.

Firstly, illustrated in FIG. 5A is an instance where the respective optical beams are focused on a forehand (lower in the figure) recording layer 100, that is, the recording layer 100 is a target layer. In this case, part of the light quantity of a light spot focused on the recording layer 100 transmits through the recording layer 100 and is then reflected at an inner (upper in the figure) recording layer 101 to cause an unwanted optical beam 53.

Figure 5B:
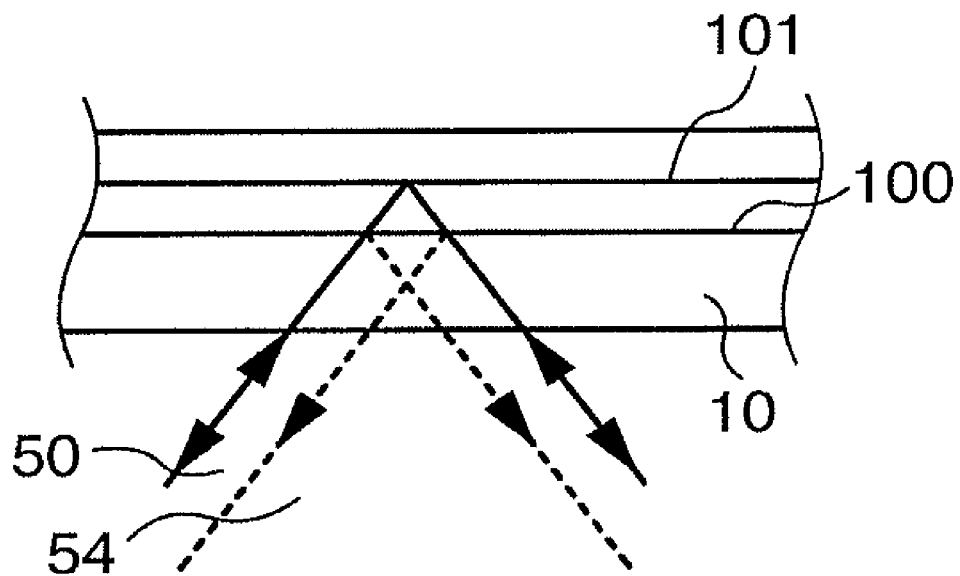

Contrary to the instance of FIG. 5A, the respective optical beams are focused on the inner (upper in the figure) recording layer 101 in an instance of FIG. 5B, that is, the recording layer 101 is a target layer in this instance. In this case, the optical beam once transmits through the forehand (lower in the figure) recording layer 100 and is thereafter focused on the recording layer 101 while part of the light quantity being reflected at the recording layer 100 to cause an unwanted optical beam 54.

Any of the unwanted optical beams 53 and 54 traces substantially the same optical path as that of the essential signal beam and reaches the photodetector, greatly diverging to irradiate each of the light receiving planes in the photodetector. Then, part of the beam overlaps and interferes with the essential signal optical beam irradiated on each light receiving area. As a result, a light and dark interference fringe is generated on each light receiving area and the light quantity is locally unbalanced by the interference fringe, giving rise to an unwanted disturbance component which leaks to the signal detected from each of the light receiving planes.

Especially, the sub-PP signal used for tracking control signal detection based on the DPP scheme is generally smaller in signal intensity than the main PP signal and is therefore greatly affected by the light quantity unbalance due to the aforementioned interference of the unwanted optical beam with the signal optical beam, so that a relatively large disturbance component as compared to the actual signal amplitude leaks to the sub-PP signal. Consequently, the tracking control signal detected through the DPP scheme is extravagantly distorted in waveform and fluctuated, leading to degraded signal quality.

The present inventors have studied the degree of an influence the interference of the unwanted optical beam with the signal beam has upon the sub-PP signal to find that, of the light quantity unbalance in each light receiving area caused by the interference, a light quantity unbalance developing on and near the sectioning line (83 or 84 in FIG. 3) formed in each of the light receiving areas for sub-PP signal detection (light receiving areas 81 and 82 in FIG. 3) most adversely affects the quality of the sub-PP signal.

On the other hand, the main PP-signal and sub-PP signal per se are mainly generated by changes in light quantity the individual light spots (60 to 62 in FIG. 3) focused on the respective light receiving areas undergo at their peripheral edges and it has been known that an optical disc for which the information signal recording density is higher and concomitantly the recording track spacing is set to be narrower tends to be largely vulnerable to the adverse influence.

In the light of the circumstances as above, according to the present invention, in an optical pickup using a tracking control signal detection means based on the DPP scheme and having the function to record information signal on an optical disc having a multi-layer structure of two or more layers or to reproduce the recorded information signal and an optical information reproducing apparatus mounting the optical pickup, the degradation in quality of a tracking control signal caused when an unwanted optical beam generated from a recording layer other than a target layer interferes with an essential signal optical beam on each of the light receiving areas of a photodetector can be cured remarkably to assure detection of a stable and highly accurate tracking control signal.

A photodetector representing a principal part in the first embodiment is constructed as shown in FIG. 1. In FIG. 1, the same constituent components as those of the photodetector which has already been described in connection with FIG. 3 are designated by the same reference numerals.

An optical system configuration of an optical pickup in the present embodiment may resemble that shown in connection with FIG. 2, for instance, with the only exception that a light receiving plane pattern in the photodetector 8 differs. Comparison of the light receiving plane pattern of photodetector 8 shown in FIG. 1 according to the present embodiment with the light receiving plane pattern of photodetector 8 shown in FIG. 3 clarifies that in the case of the present embodiment, light shielding zones or dead zones 73 and 74 each having a minor side width W set to a predetermined dimension as will be described later are respectively formed on central sectioning lines (corresponding to the sectioning lines 83 and 84 in the conventional example in FIG. 3) of light receiving areas 81 and 82 on which the focused spots 61 and 62 of sub-optical beams are incident, respectively. The light shielding zone can be realized by vapor-depositing a medium opaque to light such as for example aluminum on the light receiving plane, thereby ensuring that optical beam can be prevented from directly reaching a light receiving plane portion covered with the light shielding zone. Thus, the present embodiment can be applied to usual optical pickups in a simplified manner. The dead zone can be materialized by, for example, partially removing the light receiving plane at the counterpart portion so that even when an optical beam actually lands on the portion, no responsive signal current may be generated.

The light shielding zone is not limited to the medium such as aluminum as above exhibiting a transmission factor of substantially zero to the all wavelength band but may be a light shielding zone of a wavelength selectable medium exhibiting a transmission factor of substantially zero to a specified wavelength band, for example.

With the structure as above, the optical pickup corresponding to the present embodiment can be produced at low costs. Even when an unwanted optical beam generated from a recording layer other than a reproduction or recording target layer interferes with an essential signal optical beam obtained from the recording/reproduction target layer in the multi-layer disc as described previously, a disturbance component so generated by the interference as to leak to the sub-PP signal can be reduced efficiently by providing the light shielding zone or dead zone on each of the light receiving areas 81 and 82 for sub-optical beams.

On the other hand, the sub-PP signal per se is mainly generated by a change in light quantity at the peripheral edge of each light spot focused on each light receiving area as described previously and is therefore hardly affected by the light shielding zone or dead zone. In consequence, even in the optical disc having the recording layer of a multi-layer structure, the tracking control signal based on the DPP scheme can be detected highly accurately and stably.

The study result by the present inventors proved that the width W of the minor side the light shielding zone or dead zone has can be set within a range of about 20% to 40% of the diameter each of the focused spots 61 and 62 of sub-optical beams incident on the light receiving areas 81 and 82 has in order to suppress the disturbance component most efficiently. More preferably, since the diameter each of the focused spots 61 and 62 of sub-optical beams incident on the light receiving areas 81 and 82 has is in most general set to about 100 μm in the ordinary optical pickup, the width W of the light shielding zone or dead zone minor side is set within a range of about 20 μm to 40 μm.

Embodiment 2

Next, a second embodiment will be described by making reference to FIG. 6.

Figure 6:
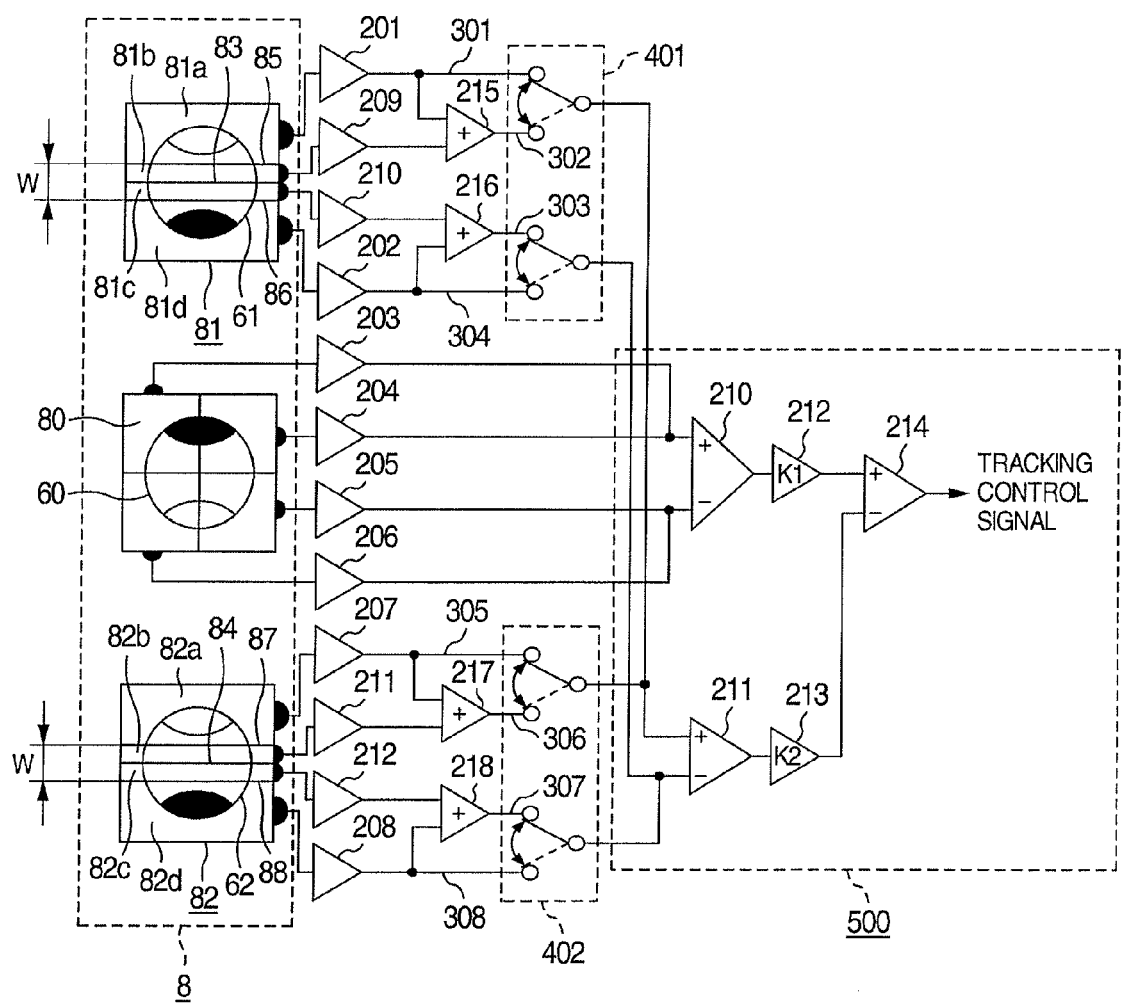
FIG. 6 is a schematic plan view diagram showing a photodetector representing a main part in a second embodiment.

A principal part of the second embodiment is illustrated in FIG. 6. In the figure, too, the same constituent components as those shown in FIGS. 1 and 3 are designated by the same reference numerals.

In the present embodiment, as substitution for the light shielding zone or dead zone in the first embodiment shown in FIG. 1, sectioning lines 85 and 86 substantially parallel to the original sectioning line 83 are newly provided above and below it in the light receiving area 81 for sub-optical beam and sectioning lines 87 and 88 substantially parallel to the original sectioning line 84 are newly provided above and below it in the light receiving area 82 for sub-optical beam, so that the light receiving area 81 can be divided into four light receiving planes 81a through 81d by the three sectioning lines and the light receiving area 82 can be divided into four light receiving planes 82a through 82d by the three sectioning lines. In this structure, the spacing W between the sectioning lines 85 and 86 and the spacing W between the sectioning lines 87 and 88 are each dimensionally comparable to the width W of the minor side the light shielding zone or dead zone has in the first embodiment shown in FIG. 1.

For example, of the four divisional light receiving planes, the light receiving plane 81a outputs a signal to a signal line 301 via a current/voltage conversion amplifier 201 and the light receiving plane 81d outputs a signal to a signal line 304 via a current/voltage conversion amplifier 202 and then from these signals, a sub-PP signal is generated which is exactly comparable to the sub-PP signal obtained from the photodetector of the first embodiment shown in FIG. 1. Quite similarly, the light receiving plane 82a outputs a signal to a signal line 305 via a current/voltage conversion amplifier 207 and the light receiving plane 82d outputs a signal to a signal line 308 via a current/voltage conversion amplifier 208 and then from these signals, a sub-PP signal is generated which is exactly comparable to the sub-PP signal obtained from the photodetector of the first embodiment shown in FIG. 1.

On the other hand, a signal delivered out of the light receiving plane 81a or 82a and detected via the current/voltage conversion amplifier 201 or 207 is added to a signal delivered out of the light receiving plane 81b or 82b and detected via current/voltage conversion amplifier 209 or 211 by means of an adder 215 or 217 so as to provide a signal outputted from signal line 302 or 306 and similarly, a signal delivered out of the light receiving plane 81d or 82d and detected via the current/voltage conversion amplifier 202 or 208 is added to a signal delivered out of the light receiving plane 81c or 82c and detected via current/voltage conversion amplifier 210 or 212 by means of an adder 216 or 218 so as to provide a signal outputted from signal line 303 or 307 and then from these output signals, a sub-PP signal is generated which is exactly comparable to the sub-PP signal obtained from the photodetector of the first embodiment shown in FIG. 3.

Then, in the present embodiment, transfer switches 401 and 402 are used to selectively switch over the signal lines for generation of the sub-PP signal in the manner described above to permit a single photodetector to play the dual function of the photodetector of the present invention and the conventional photodetector. Accordingly, through proper use of the aforementioned dual function depending on the kind of optical disc, for example, the multi-layer disc or conventional single layer recording disc, the general use capability of the optical pickup can be improved.

Embodiment 3

Next, a third embodiment will be described with reference to FIGS. 7 and 8. In the present embodiment, the optical system of optical pickup and photodetector 8 are constructed substantially identically to those in FIGS. 2 and 3, with the only exception that a diffraction grating 2 used as the beam splitting element is structured differently from the conventional one. The structure of a diffraction grating 2 used in the present embodiment is illustrated in schematic plan view form in FIG. 7. In the present embodiment, the diffraction grating 2 is divided into three areas 21, 22 and 23 by means of two sectioning lines extending in a direction (corresponding to a tangential direction of the disc as viewed on the diffraction grating 2) which is substantially orthogonal to a grating groove direction (corresponding to a radial direction of the disc as viewed on the diffraction grating 2). Of these areas, two areas 21 and 23 are grooved but the central area 22 sandwiched between them is transparent and flat.

When a beam emitted from a laser light source lands on the diffraction grating 2 of the structure as above, only part of the beam passing though the central area 22 is not diffracted and a sub-optical beam diffracted and separated from a main optical beam has a substantially strip-like blank at the central portion alone. Therefore, focused light spots of the sub-optical beams finally landing on the light receiving areas 81 and 82 in the photodetector 8 by way of the optical disc are blank or removed at their strip-like portions which are expected to reach exactly on the sectioning lines 83 and 84 and their neighborhoods as shown in FIG. 8, giving rise to focused spots each halved into spot portions 61a and 61b or spot portions 62a and 62b incident on each light receiving plane.

Accordingly, even with the light receiving area of photodetector 8 structurally lacking the light shielding zone or dead zone, meritorious effects similar to those in the first embodiment shown in FIG. 1 can be obtained.

Generally, the trisectional diffraction grating structure as in the present embodiment is advantageous from the standpoint of cost and work efficiency over the provision of the light shielding zone or dead zone on such a highly precise and expensive parts as the photodetector.

Figure 7:
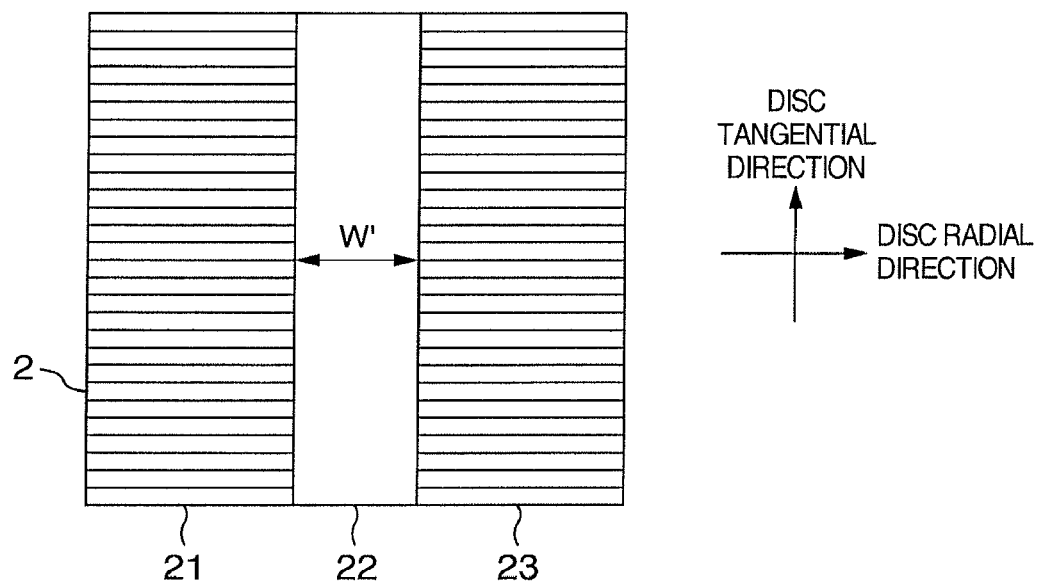
FIG. 7 is a schematic front view showing the shape of a diffraction grating used in a third embodiment.
Figure 8:
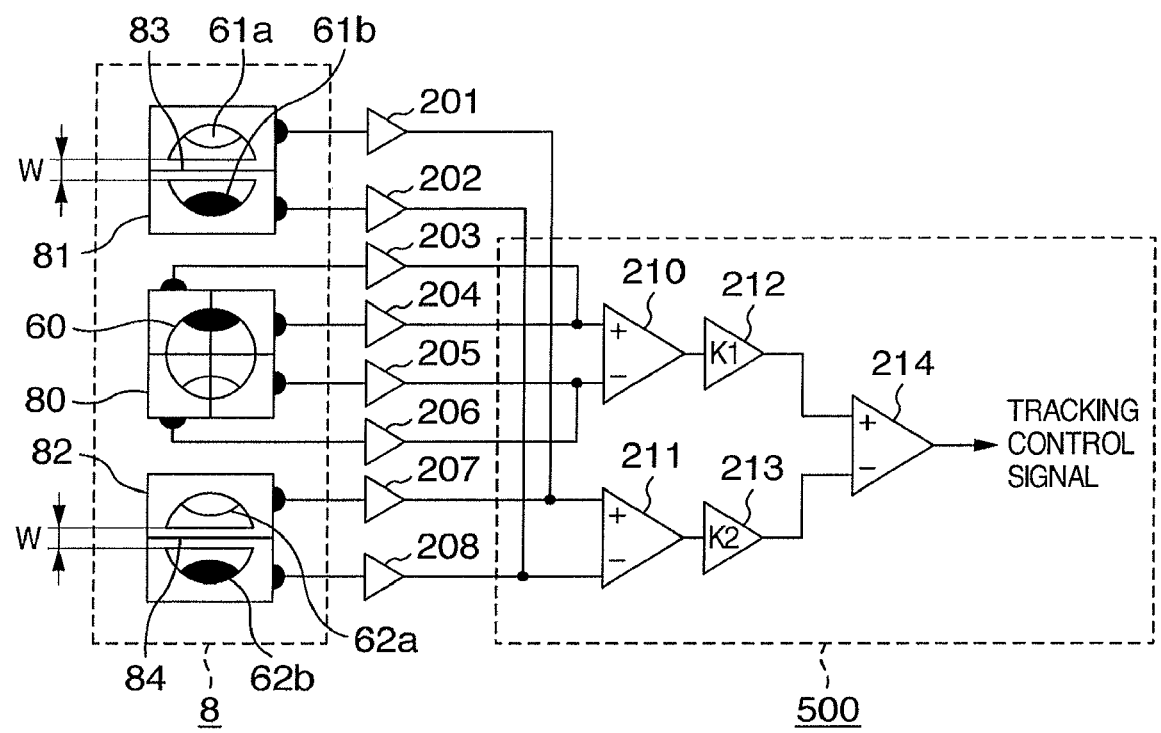
FIG. 8 is a schematic plan view diagram showing the state of sub-optical beams incident on the photodetector in the third embodiment.

Preferably, the width W' of central area 22 of the trisectional grating shown in FIG. 7 is so designed that the width W between the focused spots 61a and 61b on the light receiving area 81 of photodetector 8 or between the focused spots 62a and 62b on the light receiving area 82 equal the width W of the light shielding zone or dead zone in the FIG. 1 embodiment.

Embodiment 4

Figure 10:
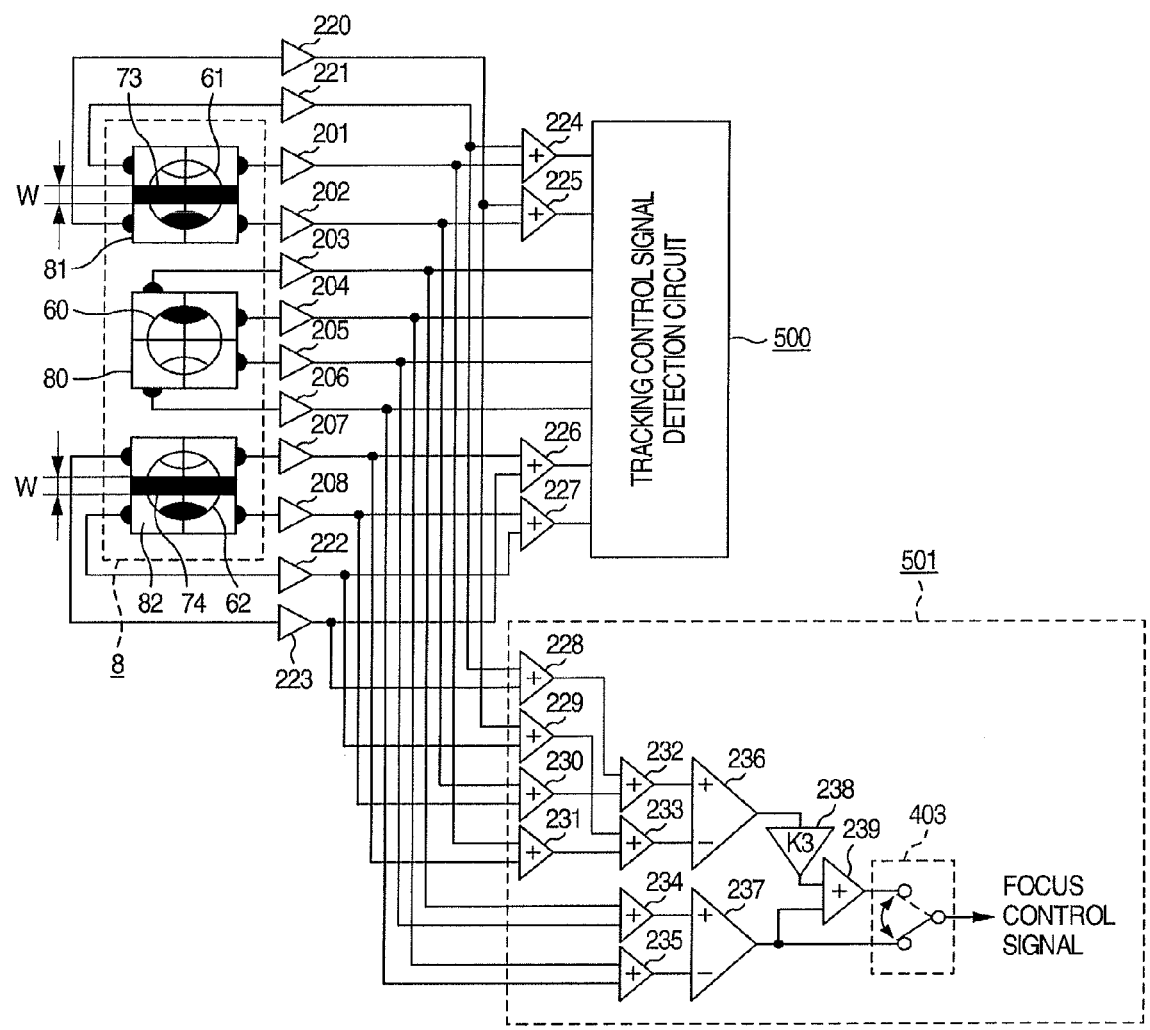
FIG. 10 is a schematic plan view diagram showing a photodetector representing a main part in a fourth embodiment.

Next, a fourth embodiment of the present invention will be described with reference to FIG. 10. In the present embodiment, like the first embodiment shown in FIG. 1, predetermined light shielding zones or dead zones 73 and 74 are provided on central sectioning lines of light receiving areas 81 and 82 for sub-optical beams, respectively, and besides a sectioning line substantially orthogonal to the central sectioning line is formed in each of the light receiving areas 81 and 82, enabling each light receiving area to be quartered like the light receiving area 80 for main optical beam. Quartering each of the light receiving areas 81 and 82 for sub-optical beams additionally to the light receiving area 80 for main optical beam has the aim of ensuring that the focus control signal based on the astigmatism scheme can be detected even in the light receiving areas 81 and 82 for sub-optical beam as in the case of the light receiving area 80 for main optical beam. In order that the focus control signal based on the astigmatism scheme can be detected from each of the light receiving area 80 for main optical beam and the light receiving areas 81 and 82 for sub-optical beams, an arithmetic operation circuit comprised of adders 228 through 235 and subtractors 236 and 237 which are provided in a focus control signal detection circuit 501 is used as shown in FIG. 10 but detection of a focus error signal based on the astigmatism scheme is of well-known technology and will not be detailed herein.

The focus control signal detection circuit 501 includes, in addition to the adders and subtractors, an amplifier 238 for amplifying, with a predetermined mu-factor K3, the focus control signal detected by way of the light receiving areas 81 and 82 for sub-optical beams and an adder 239 for adding together the amplified sub-optical beam focus control signal and a focus control signal for main optical beam detected through the light receiving area 80 for main optical beam. The scheme for making the sum signal of focus control signals for main optical beam and sub-optical beam a new focus control signal is called a differential astigmatic detection scheme (DAD scheme) and is effective to eliminate a disturbance component leaking to the focus control signal based on the astigmatism scheme and detect an excellent focus control signal. The scheme per se belongs to a well-known technology and will not be detailed herein.

Additionally provided in the focus control signal detection circuit 501 is a transfer switch 403 for switching over from the aforementioned sum signal of the focus control signal for main optical beam and the focus control signal for sub-optical beam to the conventional focus control signal generated from only the main optical beam and vice versa so that selective switch over to delivery of either focus control signal may be carried out depending on the kind of the optical disc subject to reproduction or recording.

Putting the focus control signal detection circuit 501 aside, a tracking control signal detection circuit 500 similar to that in the FIGS. 1 and 6 embodiments is included in the present embodiment but details of the tracking control signal detection circuit have already been given in connection with FIGS. 1, 3 and 6 and will not be given herein.

Embodiment 5

Figure 11:
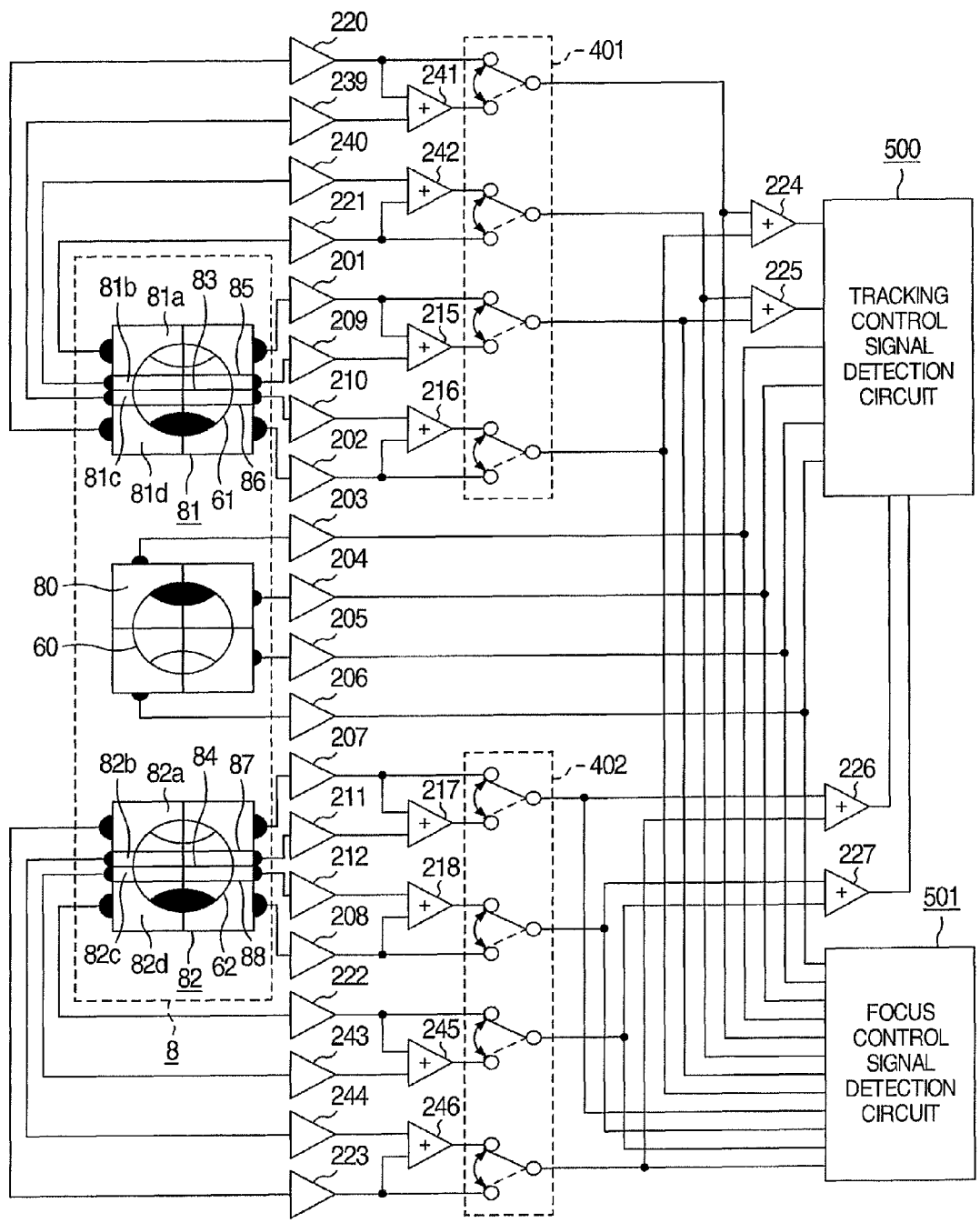
FIG. 11 is a schematic plan view diagram showing a photodetector representing a main part in a fifth embodiment.

A fifth embodiment of the present invention will now be described with reference to FIG. 11. In the present embodiment, the light receiving plane structure is substantially the same as that in the second embodiment of the invention shown in FIG. 6 with the only exception that a sectioning line orthogonal to sectioning lines 83, 85 and 86 is provided in a light receiving area 81 for sub-optical beam and a sectioning line orthogonal to sectioning lines 84, 87 and 88 is provided in a light receiving area 82 for sub-optical beam to thereby divide each of the light receiving areas into 8 divisional areas in total. Structurally, like the second embodiment of the invention shown in FIG. 6, tracking control signal detection can be executed by a tracking control signal detection circuit 500 and besides, like the fourth embodiment shown in FIG. 10, focus control signal detection can also be executed by a focus control signal detection circuit 501. The contents of tracking control detection scheme and focus control signal detection scheme has already been detailed in connection with other embodiments and so, for avoidance of prolixity, will not be detailed here. Advantageously, with the construction of the present embodiment, for either the focus control signal or the tracking control signal, a signal based on the light receiving plane structure of the invention and a signal based on the conventional light receiving plane structure can selectively be switched and detected.

Incidentally, the optical pickup using the present invention is not limited structurally to the optical system configuration or light receiving plane structure explained in the foregoing embodiments but may have any optical system configuration or light receiving plane structure so long as the optical information reproduction apparatus is mounted with the optical pickup adopting as the tracking control signal detection scheme a detection scheme corresponding to the DPP scheme or the DPP scheme.

Figure 9:
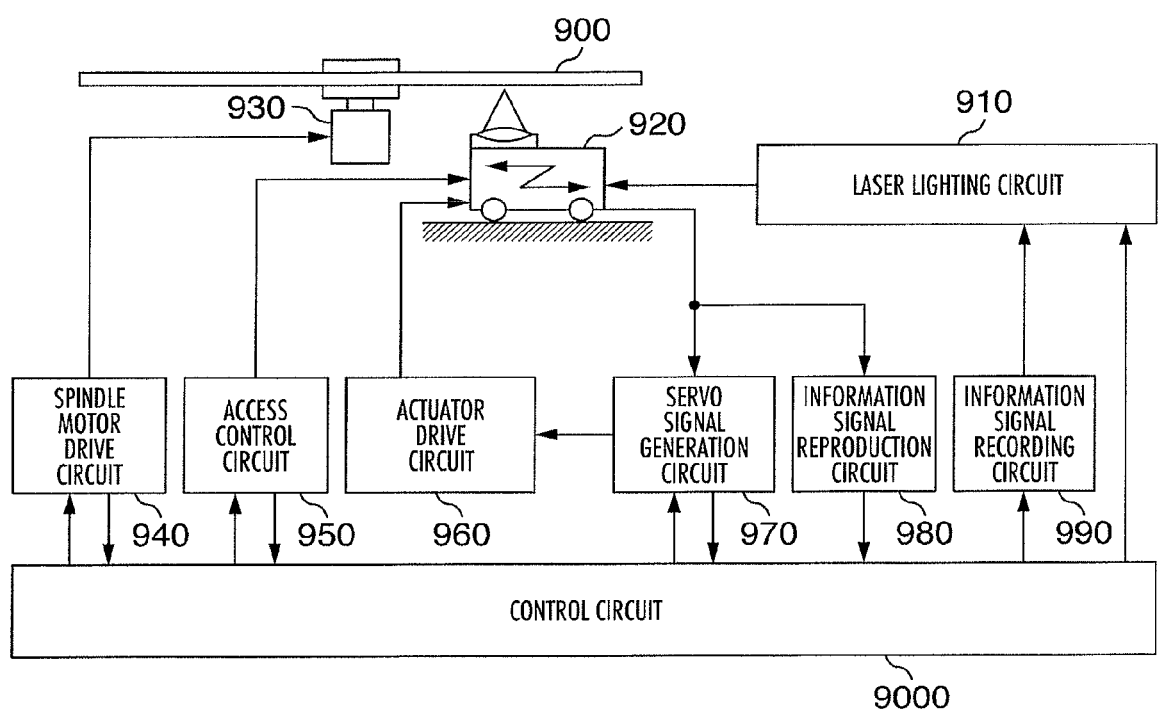
FIG. 9 is a block diagram of an optical information recording/reproduction apparatus mounting the optical pickup according to first to fifth embodiments.

Reverting to FIG. 9, an optical information recording/reproduction apparatus mounted with the optical pickup according to the first to fifth embodiments is schematically illustrated in block diagram form. As shown, the apparatus comprises an optical disc 900, a laser lighting circuit 910, an optical pickup 920, a spindle motor 930, a spindle motor drive circuit 940, an access control circuit 950, an actuator drive circuit 960, a servo signal generation circuit 970, an information signal reproduction circuit 980, an information signal recording circuit 990 and a control circuit 9000. Responsive to an output from the optical pickup 920, the control circuit 9000, servo signal generation circuit 970 and actuator drive circuit 960 control an actuator. By using the output from the optical pickup in the present embodiment for actuator control, stable and highly accurate information recording and information reproduction can be assured.

In the course of reproducing an information signal from an optical disc having a recording layer of multi-layer structure or recording the information signal in the optical disc, by using the means described as above, the degradation in quality of tracking control signal due to interference of an unwanted optical beam generated from a recording layer other than a reproduction or recording target layer with an essential signal beam can be cured sufficiently and a stable and highly precise tracking control signal can be detected.

Embodiment 6

Figure 12:
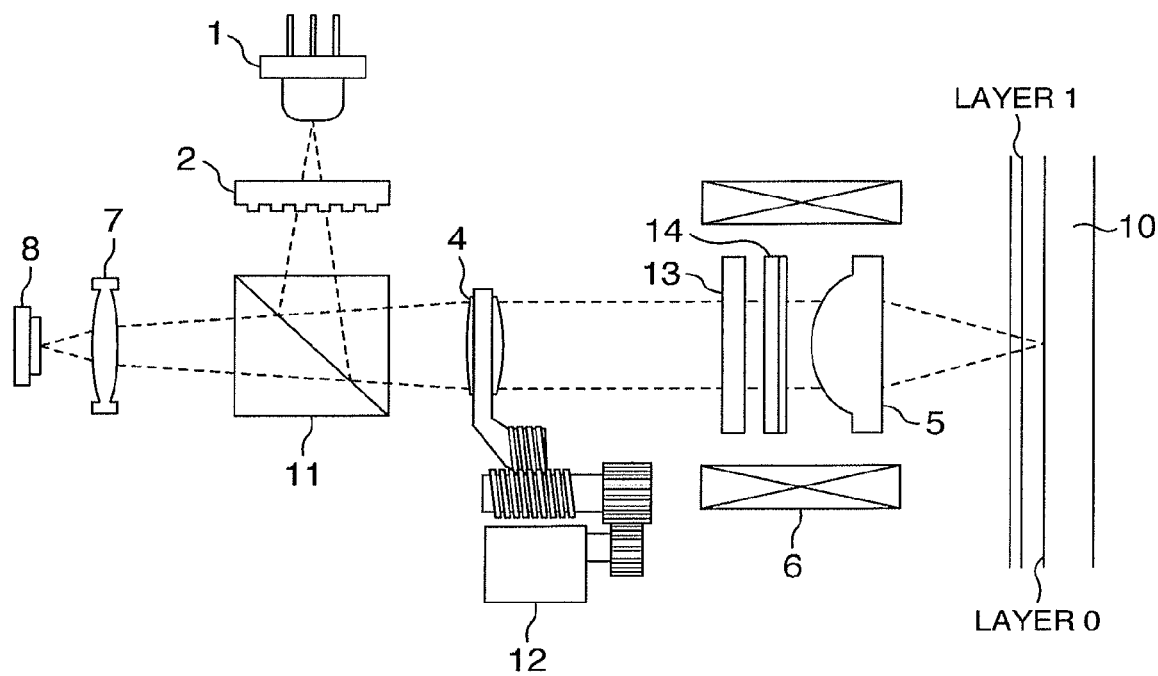
FIG. 12 is a schematic diagram showing an optical system configuration of an optical pickup apparatus in the present invention.

Referring to FIG. 12, an example of the optical pickup according to a sixth embodiment of the invention is configured as schematically illustrated therein.

A laser beam emitted from a laser light source 1 lands on a diffraction grating 2 representing a beam splitting element so as to be split into a main optical beam due to a 0-th diffracted beam and two sub-optical beams due to positive and negative first order diffracted beams. Respective optical beams are changed in their traveling directions by a polarization beam splitter 11 and caused to go through a collimate lens 4 driven by a stepping motor 12 to correct an incident optical beam for its spherical aberration, an optical element 13 having a diffraction region for diffracting part of the main optical beam and the sub-optical beams and a ¼ wavelength plate 14 for giving mutually orthogonal polarized components a phase difference of 90°, finally reaching an objective lens 5 by which they are focused independently on a predetermined recording layer in an optical disc 10. Reflection optical beams of the respective focused light spots from the optical disc transmit through the objective lens 5 and reach a photodetector 8 via the ¼ wavelength plate 14, optical element 13, collimate lens 4, polarization beam splitter 11 and detection lens 7.

Preferably, the objective lens 5, ¼ wavelength plate 14 and optical element 13 are mounted in an actuator 6 for driving them in predetermined directions. A tracking control signal to be described later is fed back to the actuator to control the position of the objective lens to thereby execute tracking control. As the spherical aberration correction means, a liquid crystal device may be used.

The photodetector 8 detects the tracking control signal through the DPP scheme. The DPP scheme will be described below in brief.

An example of the DPP detection scheme will be described by making reference to a conventional example of photodetector schematically shown in FIG. 13. Arranged in the photodetector 8 are a light receiving area 80 on which a focused light spot 60 of main optical beam reflected from the optical disc is incident and light receiving areas 81 and 82 on which focused light spots 61 and 62 for sub-optical beams reflected from the optical disc are incident. Of these areas, the light receiving area 80 for main optical beam has a light receiving plane which is quartered by two substantially mutually perpendicular sectioning lines whereas each of the light receiving areas 81 and 82 for sub-optical beams has a light receiving plane halved by a sectioning line 83 or 84 which is substantially vertical to a direction corresponding to the radial direction of the optical disc. Further, in FIG. 13, the direction corresponding, on the photodetector, to the radial direction of the optical disc is shown by the arrow (up and down direction on the sheet of drawing). From these divisional light receiving areas, currents corresponding to incident light intensities are generated, converted independently of each other by means of current/voltage conversion amplifiers 201 to 208 and thereafter subjected to subtraction by means of subtractors 25 and 28, so that a push-pull signal of main optical beam 60 (hereinafter this signal is called a main PP signal for simplicity of explanation) and a push-pull signal as a result of addition of optical beams 61 and 61 (hereinafter this signal is called a sub-PP signal for simplicity of explanation) can be outputted.

The main optical beam irradiates the optical disc while being spaced by ½ track from the respective sub-optical beams, with the two sub-optical beams being irradiated while being spaced apart from each other by 1 track. Accordingly, the main PP signal is outputted having a phase difference of 180° in relation to each of the sub-PP signals. Therefore, by amplifying the two types of PP signals with suitable mu-factors K1 and K2 by means of amplifiers 212 and 213, respectively, and then subtracting them at a subtractor 214, an unwanted DC component and an in-phase disturbance component which are contained in both the main PP signal and the sub-PP signals can be eliminated and an excellent tracking control signal can be obtained.

In this manner, in the DPP scheme, an offset of the tracking control signal caused concomitantly with a tracking displacement of the objective lens can be eliminated with the simplified optical system configuration and the tracking control signal of high quality can be detected stably.

To add, in the objective lens position control in the optical pickup apparatus, not only the tracking position control but also the focus position control which is position control along the optical axis is carried out concurrently. As the control signal detection scheme used for the focus position control, the astigmatism scheme is used widely in general. Like the tracking control, the focus control signal can be detected by applying a predetermined arithmetic operation process to the detection signal from each of the light receiving planes of the photodetector shown in FIG. 13.

As will be seen from the above, because of its advantage, the DPP scheme provides for the widely used detection scheme. But when the tracking control signal detection mean based on the DPP scheme is used for the optical pickup apparatus or optical information recording/reproduction apparatus for reproducing/recording the optical disk having a recording layer of multi-layer structure, new problems as below arise.

In reproducing/recording the multi-layer optical disc, the individual optical beams are focused on one of recording layers which is a target of signal reproduction/recording (the recording layer will hereinafter be called a target layer) and reflection optical beams from the target recording layer are detected. In this phase, part of the quantity of light is not reflected by the target layer but is reflected by a recording layer other than the target layer (this recording layer will hereinafter referred to as a different layer). The optical beam from the different layer traces an optical path substantially identical to that of a signal optical beam from the target layer and lands on each light receiving plane in the photodetector, resulting in an unwanted optical beam which prevents accurate detection of the signal optical beam.

This unwanted optical beam interferes with the essential signal optical beam on the light receiving plane, causing an interference fringe. Bright and dark stripes of the interference fringe disturb the light quantity balance on each light receiving plane, giving rise to an unwanted interlayer cross stalk component which affects the output signal from each light receiving plane.

This phenomenon will be described specifically by way of example of an optical disc 10 having two recording layers (interlayer distance δ) 100 and 101 as shown in FIGS. 14A and 14B.

An optical path of an optical beam incident on the optical disc of multi-layer structure is schematically illustrated in FIGS. 14A and 14B, showing a state in which a main optical beam 50 and sub-optical beams 51 and 52 (not shown) are focused from below on the sheet of drawing on the optical disc 10 having two recording layers 100 and 101 on one side.

Illustrated in FIG. 14A is an instance where the individual optical beams are focused on the recording layer 100 (in the case of the target layer being recording layer 100). In this case, part of the quantity of light of the optical beam focused on the target layer transmits through the target layer and is reflected at a recording layer 101 ahead of the layer 100 to cause an unwanted optical beam 53.

Illustrated in FIG. 14B is an instance where conversely to the case of FIG. 14A, the recording layer 101 is a target layer. In this case, the optical beam once transmits through the front recording layer 100 and thereafter focused on the recording layer 101. In this process, however, part of the quantity of light is reflected at the recording layer 100, resulting in an unwanted optical beam 54.

Any of the unwanted optical beams 53 and 54 traces an optical path substantially identical to that of the essential signal optical beam to reach the photodetector. But since the focal point of each of the unwanted optical beams 53 and 54 differs from that of the essential optical beam 50, the spot size of each unwanted optical beam largely differs from that of the essential signal optical beam on the photodetector surface. Thus, on each of the light receiving planes, part of the unwanted optical beam overlaps the signal optical beam, causing an interference. Then, bright and dark portions of an interference fringe disturb the balance of the quantity of light detected from each photodetector plane and a resulting unwanted interlayer cross talk affects the output signal.

Especially, the sub-PP signal used for tracking control signal detection based on the DPP scheme has, in general, a signal intensity less than that of the main PP signal. Therefore, the interlayer cross talk greatly affects the sub-PP signal. As a result, a large waveform distortion and fluctuation are generated in the tracking control signal detected through the DPP scheme and the signal quality is degraded.

Figure 15:
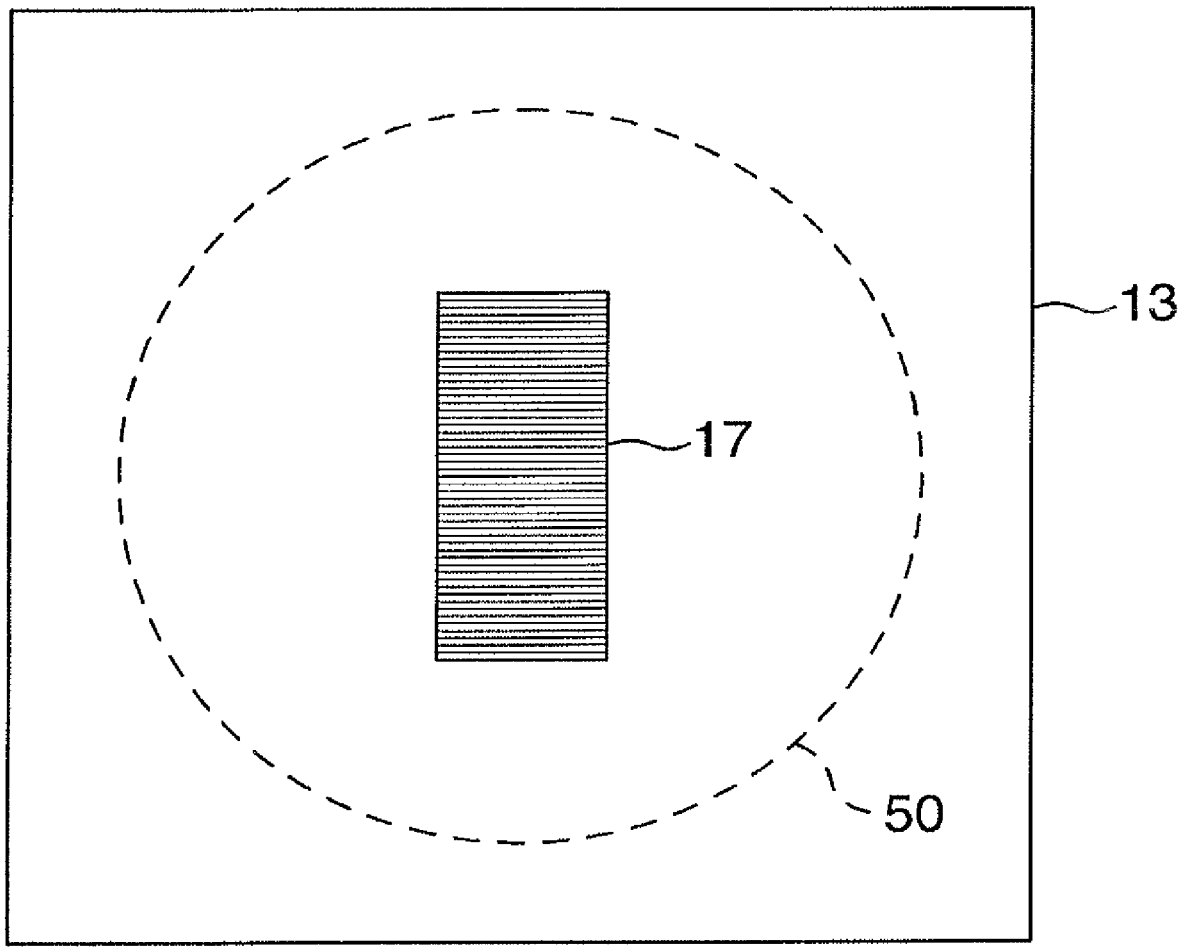
FIG. 15 is a schematic diagram showing an example of the shape of a diffraction area an optical element for diffracting part of an optical beam has.
Figure 16A:
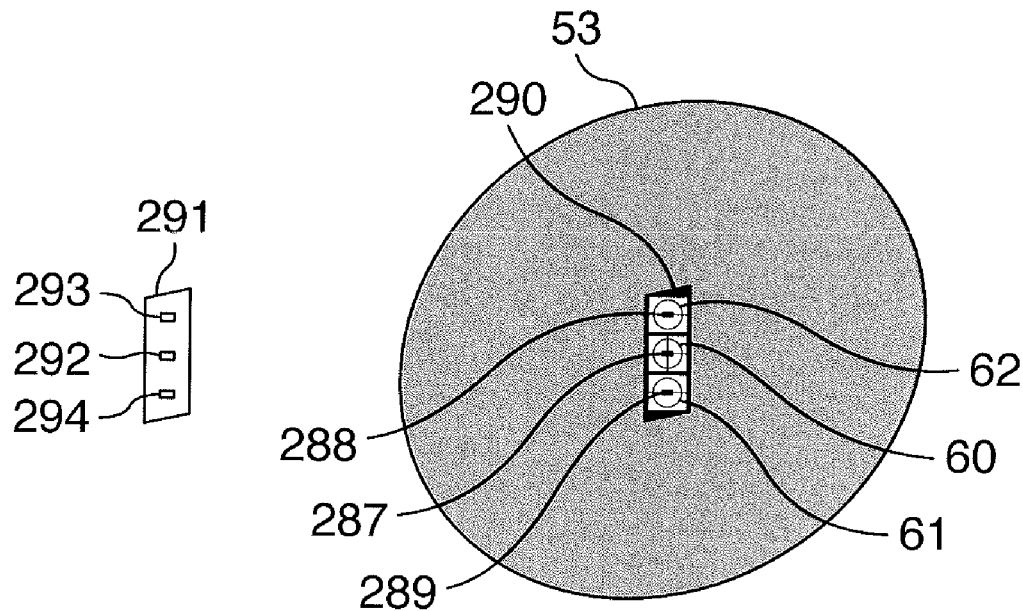
FIGS. 16A and 16B are schematic diagrams showing light intensity distributions of signal optical beam and unwanted optical beams on the photodetector, respectively, when the optical element of FIG. 15 is mounted.
Figure 16B:
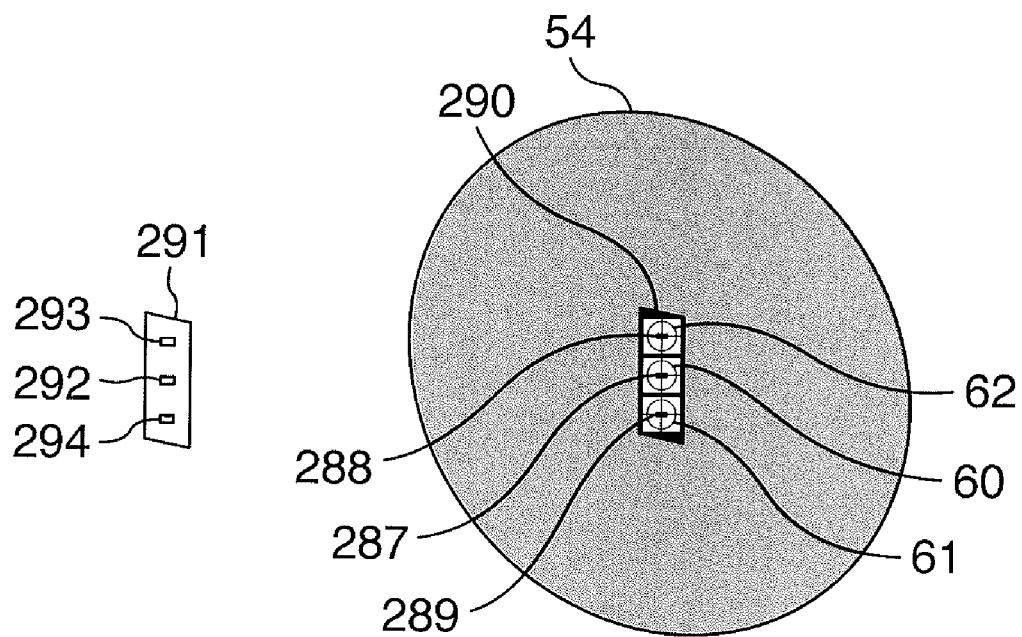

Under the circumstances, in Patent Document 2, the interlayer cross talk is suppressed by using the optical element 13 provided with a diffraction area for diffracting part of the main optical beam and the sub-optical beam. This diffraction area of optical element 13 may be, for example, a diffraction grating or a polarization/diffraction grating. In case the polarization/diffraction grating is used for the diffraction area, this optical element functions to diffract only an optical beam reflected by the optical disc, having no influence upon the spot shape on the optical disc. An example of diffraction area 17 the optical element 13 has is illustrated in FIG. 15. The shape of the diffraction area 17 may be changed in compliance with the shape of the photodetector. Schematically illustrated in FIG. 16A is a light intensity distribution on the photodetector plane when the FIG. 12 optical pickup apparatus mounted with the optical element 13 takes the recording layer 100 as a target layer. Schematically illustrated in FIG. 16B is a light intensity distribution on the photodetector plane when the FIG. 12 optical pickup apparatus mounted with the optical element 13 takes the recording layer 101 as a target layer. By dint of the diffraction area of optical element 13, a dark portion 290 without light quantity is generated in an unwanted optical beam 53. This restrains the unwanted optical beam from reaching the detector. Accordingly, the unwanted optical beam can be restrained from interfering with a signal optical beam on the photodetector and the deterioration in a tracking control signal can be reduced. By dint of the diffraction area of optical element 13, a diffracted light spot 291 of the diffracted unwanted optical beam is irradiated on the outside of the photodetector. With the ¼ wavelength plate 14 and optical element 13 mounted to the actuator 6, movement of the unwanted optical beam dark portion 290 on photodetector plane concomitant with an objective lens shift can be suppressed. Consequently, even in the presence of an objective lens shift, incidence of the unwanted optical beam 53 on the photodetector 8 can be reduced and an increase in interlayer cross talk can be suppressed. Similarly, in the main optical beam and sub-optical beams, dark portions 287, 288 and 289 without light quantity are formed by the optical element 13 and their diffracted light spots 292, 293 and 294 are irradiated on the outside of the photodetector area. The spectral ratio of diffraction area 17 can be set in many ways. Accordingly, the quantity of light of the dark portions 287, 288, 289 and 290 can be adjusted in many ways. A photodetector 8 can be provided newly to detect the quantity of light of main optical diffraction spot 292 generated by the optical element 13 and then, a detected signal can be added to an RF-SUM signal obtained from the main optical beam receiving plane 80. In this manner, a more excellent jitter value, for example, can be obtained.

In the study of geometrical optics, with the optical element 13 provided, an unwanted optical beam does not seem to be incident on the photodetector. But, waveform distortion and fluctuation of tracking control signal is still generated owing to an interlayer cross talk, making it difficult to detect a highly accurate and stable tracking control signal.

Figure 13:
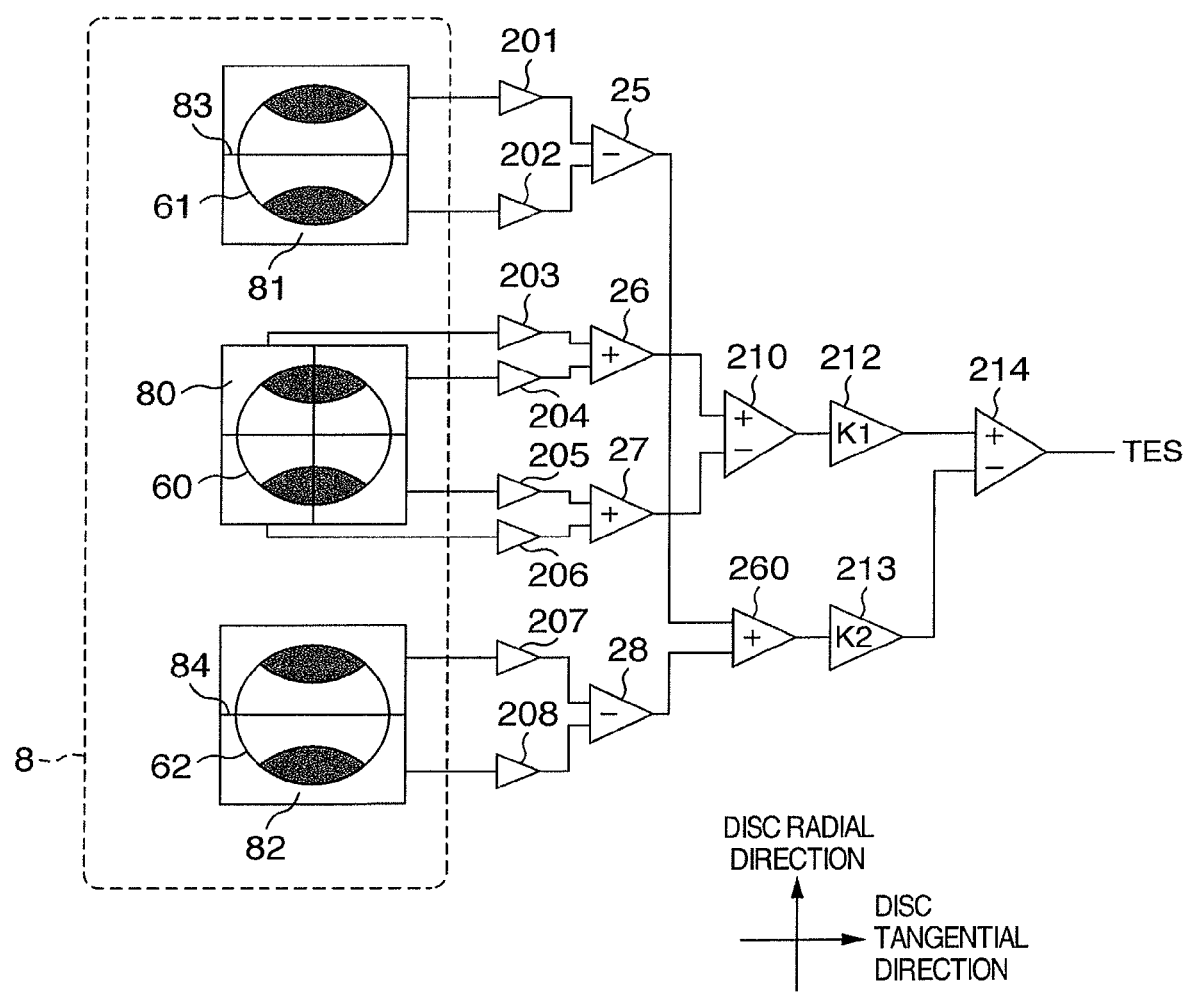
FIG. 13 is a schematic plan view diagram showing a conventional example of the photodetector.

Then, the present inventors have studied, from the standpoint of wave optics, the degree of an influence the interference of an unwanted optical beam with a signal optical beam has upon a sub-PP to find that, of unbalance of light quantity due to the interference, an unbalance of light quantity generated on and near the sectioning lines 83 and 84 in the sub-optical beam receiving planes 61 and 62 in FIG. 13, respectively, most adversely affects the quality of the sub-PP signal.

Figure 17:
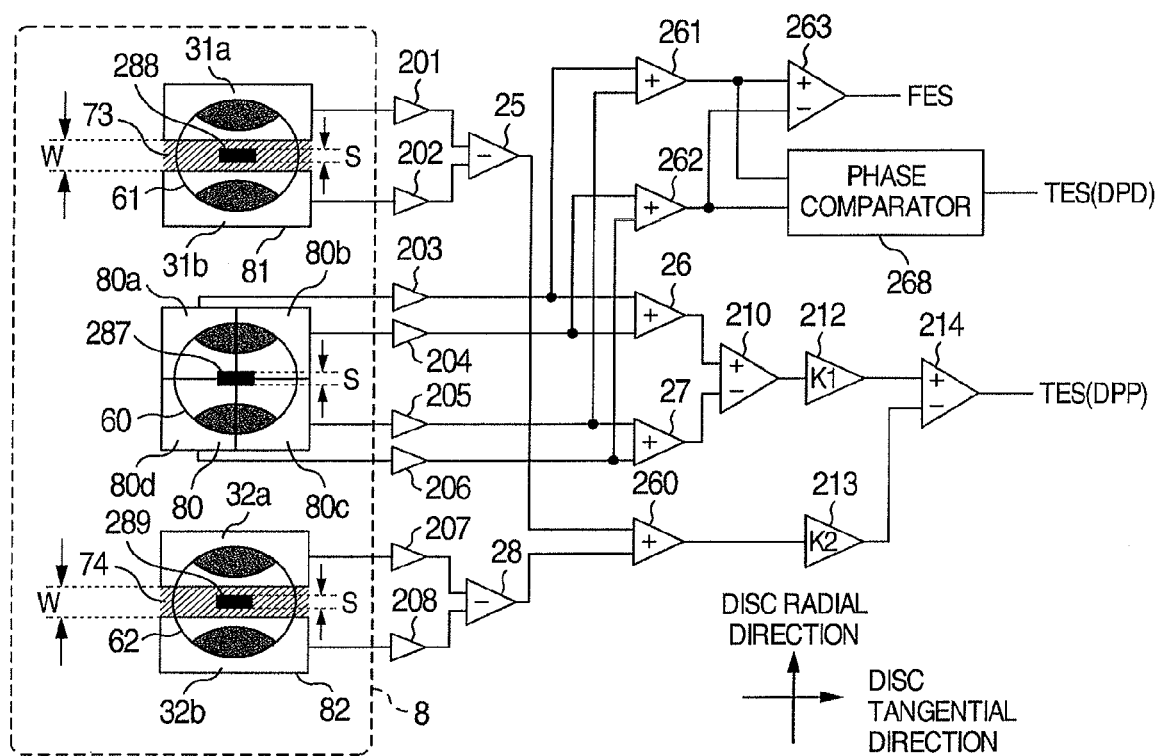
FIG. 17 is a schematic plan view diagram showing a photodetector representing a main part in a sixth embodiment.

Accordingly, a photodetector representing a main part of a sixth embodiment is structured as illustrated in FIG. 17. The optical system configuration of the optical pickup apparatus in the present embodiment can be similar to that of the optical pickup shown in, for example, FIG. 12.

The light receiving plane pattern of photodetector 8 in the present embodiment features that on and near the central sectioning line 83 of light receiving plane 81 for sub-optical beam and on and near the central sectioning line 84 of light receiving plane 82 for sub-optical beam, strip light shielding zone or dead zone 73 and 74 are provided, respectively, having a side width W, set to a dimension to be described later, in a direction corresponding to the radial direction of the optical disc.

A light receiving plane 80 for main optical beam is quartered into divisional areas 80a, 80b, 80c and 80d as shown in FIG. 17 and light quantity signals obtained from the respective divisional areas are A, B, C and D. Further, the respective light receiving planes for sub-optical beams 81 and 82 are halved into divisional areas 31a and 31b and 32a and 32b as shown in FIG. 17, respectively, and light quantity signals obtained from the respective divisional areas are I and J and K and L, respectively. The focus control signal and tracking control signal in the present embodiment are exemplified hereunder. The focus control signal based on the astigmatism scheme is obtained by operating equation (1):

$$FES:(A+C)-(B+D) \qquad (1)$$

The scheme for detection of the focus control signal is not limited to the above astigmatism scheme but may use another scheme, for example, a knife edge method.

The RF signal can be obtained by operating equation (2):

$$\text{RF-SUM}: A+B+C+D \quad (2)$$

The tracking control signal based on the DPP scheme can be obtained by operating equation (3):

$$\text{TES(DPP)}:[(A+B)-(C+D)]-k2[(I-J)+(K-L)] \quad (3)$$

and the tracking control signal based on the DPD scheme can be generated by comparing phases of two signals, each indicated by equation (4), by means of the phase comparator 268:

$$\text{TES(DPD)}:(A+C),(B+D) \quad (4)$$

The light shielding zone can be realized by covering the light receiving plane with a medium having a light transmission factor of nearly zero, for example, aluminum to block incidence of optical beam on the light receiving plane. The light shielding zone is not limited to the medium such as aluminum as above exhibiting a transmission factor of substantially zero to all wavelength band of light but may be a light shielding zone of a wavelength selectable medium, for example, exhibiting a transmission factor of substantially zero to a specified wavelength band. Further, the dead zone can be realized by removing, for example, a predetermined part of light receiving plane so that even with the optical beam being incident, no signal current may be generated.

The width W of the minor side the light shielding zone or dead zone has can be set within a range of about 20% to 40% of the diameter each of the focused spots 61 and 62 of sub-optical beams incident on the light receiving areas 31a and 31b and the light receiving areas 32a and 32b has in order to eliminate an interlayer cross talk most efficiently. More preferably, since the diameter the focused spot of sub-optical beam incident on the light receiving plane is in most general set to about 100 μm, the width W is set within a range of about 20 μm to 40 μm. The light shielding zone or dead zone may not always take the form of a strip.

A structure to be described below will substitute for the aforementioned light shielding zone or dead zone. Sectioning lines 95 and 96 substantially parallel to the central sectioning line 83 are newly provided above and below the line 83 in the light receiving area 81 for sub-optical beam and sectioning lines 97 and 98 substantially parallel to the central sectioning line 84 are newly provided above and below the line 84 in the light receiving area 82 for sub-optical beam of photodetector, so that each of the light receiving areas 81 and 82 can be divided into four light receiving planes. These new divisional light receiving planes of the light receiving area of sub-optical beam light receiving plane 81 are sequentially designated by 81a, 81b, 81c and 81d. Similarly, the divisional light receiving planes of the sub-optical beam light receiving plane 82 are sequentially designated by 82a, 82b, 82c and 82d. The spacing M between the newly provided sectioning lines 95 and 96 and the spacing M between the sectioning lines 97 and 98 are each dimensionally comparable to the width W of the light shielding zone or dead zone has in the first embodiment shown in FIG. 1. With this structure, the individual light receiving planes deliver signals via current/voltage conversion amplifiers and then, signals from the light receiving planes 81a and 81d are subtracted from each other and signals from the light receiving planes 82a and 82d are subtracted from each other, resulting signals obtained by these subtractions being added together to provide a sub-PP signal which is comparable to the sub-PP signal obtained from the photodetector of FIG. 17.

On the other hand, signals from the light receiving planes 81a and 81b are added to provide a sum signal, signals from the light receiving planes 81d and 81c are added to provide a sum signal, signals from the light receiving planes 82a and 82b are added to provide a sum signal and signals from the light receiving planes 82d and 82c are added to provide a sum signal, these sum signals being processed through an operation similar to that described above to provide a sub-PP signal which is comparable to a sub-PP signal obtained from the conventional photodetector shown in FIG. 13. Then, a predetermined switching means is used to select the use of only the output signals from the light receiving planes 81a, 81d, 82a and 82d for generation of the sub-PP signal or the use of sum signals of output signals from the light receiving planes 81a, 81d, 82a and 82d and output signals from the light receiving planes 81b, 81c, 82b and 82c as well, thereby ensuring that a structure having the functions of the conventional photodetector and the photodetector of the present invention in common can be attained. In this manner, the function can be selected in accordance with the number of recording layers of the optical disc subject to recording/reproduction and therefore the general use capability of the optical pickup apparatus can be improved.

Figure 18:
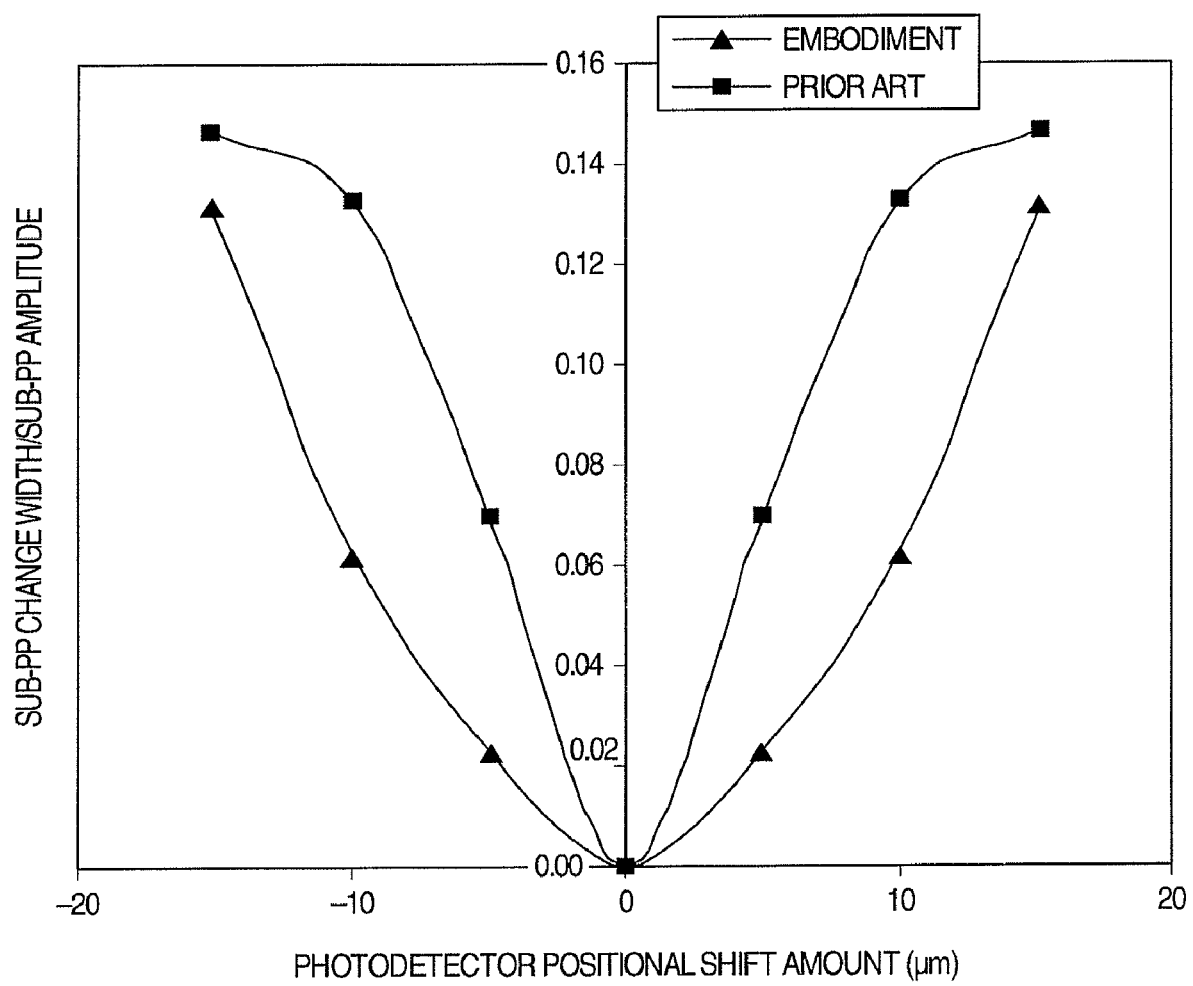
FIG. 18 is a graph showing results of simulation of amounts of interlayer cross talk leakage to a sub-PP signal in relation to positional shifts of the light receiving plane in the sixth embodiment.

Turning to FIG. 18, results of simulation of leakage amounts of inter-layer cross talk to the sub-PP signal in the present embodiment and an embodiment in the Patent Document 2 are graphically illustrated, where abscissa represents positional shift amounts of light receiving plane and ordinate represents the ratio between the sub-PP signal amplitude and the inter-layer cross talk component. It will been through comparison of these results that as the photodetector position shifts, the interlayer cross talk amount decreases greatly over all regions in the present embodiment and the amount can be almost halved at a position where the effect is maximized. The great reduction effect in relation to the positional shift of the photodetector is very advantageous from the viewpoint of manufacture irregularity and temporal change.

It will be appreciated that if the ratio of diffraction area 17 provided in the optical element 13 to the optical beam effective diameter increases, the unwanted optical beam dark portion area 290 on the photodetector also expands and the interlayer cross talk can further be reduced. But the dark portion areas 287, 288 and 289 in the main optical beam and sub-optical beams also expand similarly and the jitter value and PP signal are degraded. To avoid this inconvenience, in the present embodiment, the light shielding zones or dead zones 73 and 74 are provided to reduce the interlayer cross talk to a great extent. Thus, with the width S of the side of the dark part areas 287, 288 or 289 in a direction corresponding to the radial direction of the optical disc being equal or slightly smaller than the width W of the light shielding zone or dead zone, the effect of sufficiently reducing the interlayer cross talk can be attained. Accordingly, the degradation in jitter value attributable to the dark portion area 287, 288 or 289 can be suppressed. In addition, since the main PP and sub-PP signals are principally generated by changes in light quantity at the respective light spot outer peripheral edges, the dark portion area 287, 288 or 289 existing at the optical beam central portion hardly affects the PP signal per se.

Similarly, since the main PP and sub-PP signals are principally generated by changes in light quantity at the respective light spot outer peripheral edges, the light shielding zone or dead zone provided at the photodetector central portion hardly affects the PP signal per se.

Namely, in the present embodiment, by using an optical pickup apparatus comprising an optical element having a diffraction area for diffracting part of the main optical beam and sub-optical beams reflected at the optical disc and a photodetector including a light receiving plane for main optical beam on which the main optical beam is incident and light receiving planes for sub-optical beams on which the sub-optical beams are incident, each of the light receiving planes for sub-optical beams being halved by at least one sectioning line substantially vertical to a direction corresponding to the radial direction of the optical disc and being provided with a strip light shielding zone of a predetermined width formed on and near the sectioning line for blocking light or a dead zone formed by removing the light receiving plane at that portion, the tracking control signal based on the DPP scheme can be detected highly accurately and stably even in the optical disc having a recording layer of multi-layer structure.

Embodiment 7

Figure 19A:
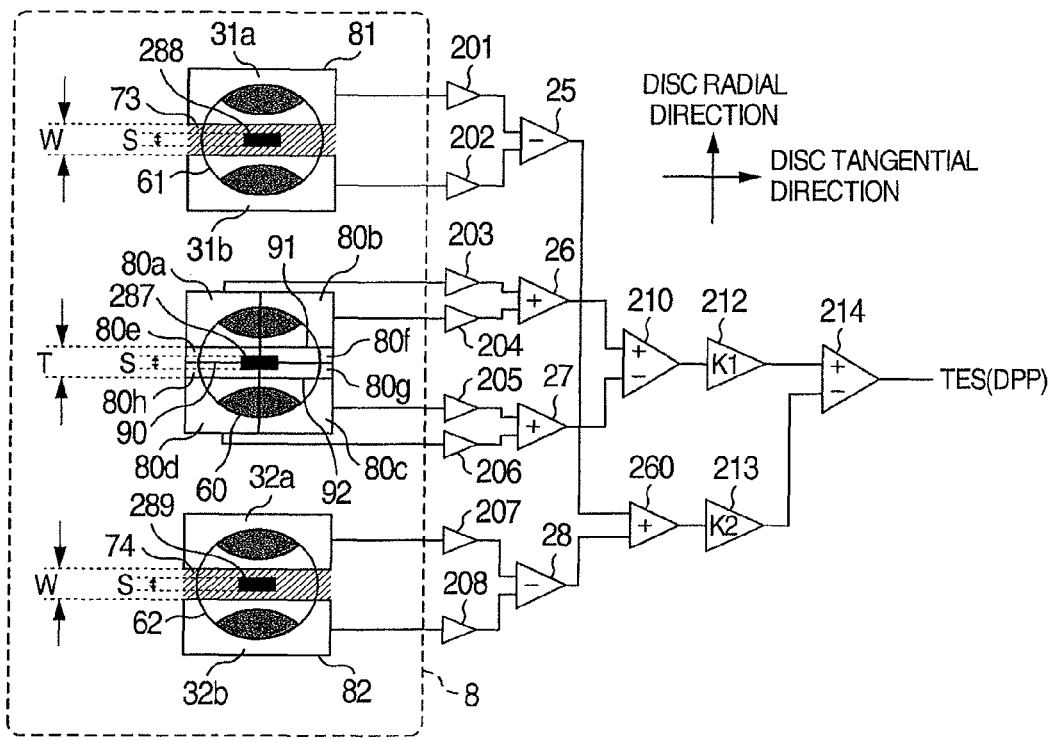
FIGS. 19A and 19B are schematic plan view diagrams showing a photodetector representing a main part in a seventh embodiment.
Figure 19B:
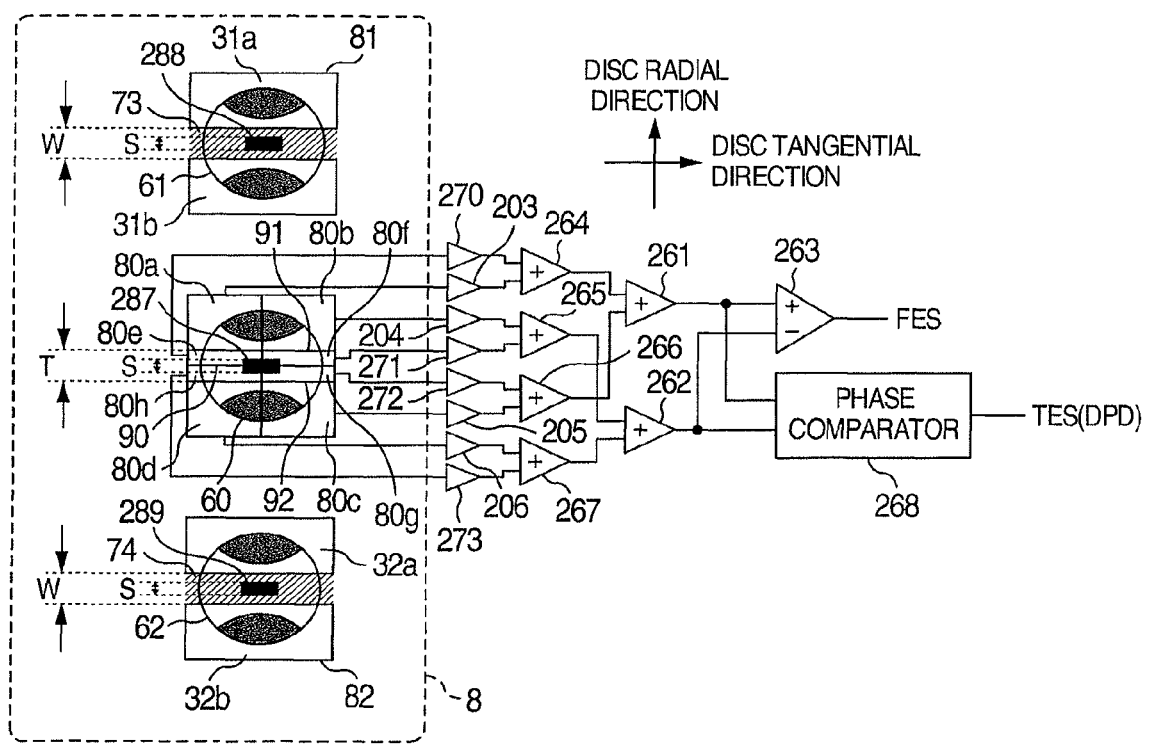

Next, a seventh embodiment will be described with reference to FIGS. 19A and 19B. In the present embodiment, an optical pickup apparatus is provided which can assure detection of an excellent DPP signal even when the objective lens shifts while maintaining the interlayer cross talk suppression effect the sixth embodiment attains. The optical system configuration of the optical pickup apparatus can be identical to that of the optical pickup apparatus shown in, for example, FIG. 12 with the exception that the light receiving plane pattern in a photodetector 8 differs from that in FIG. 12. Illustrated in FIGS. 19A and 19B is the photodetector 8 representing a main part of the seventh embodiment. In the present embodiment, sectioning lines 91 and 92 which are substantially parallel to a central sectioning line 90 of light receiving area for main optical beam are newly formed above and below the line 90, so that the light receiving plane for main optical beam is divided into 8 light receiving divisional areas. Also illustrated in FIG. 19A in association with the photodetector is an arithmetic operation circuit for performing an operation process to be described later to generate a tracking control signal based on the DPP scheme. In FIG. 19B, an arithmetic operation circuit for performing an operation process to be described later to generate a focus error signal and a tracking control signal based on the DPD scheme is illustrated in association with the photodetector.

Factors of degrading the DPP signal at the time of objective lens shift will be described with reference to FIGS. 17 and 20.

Figure 20:
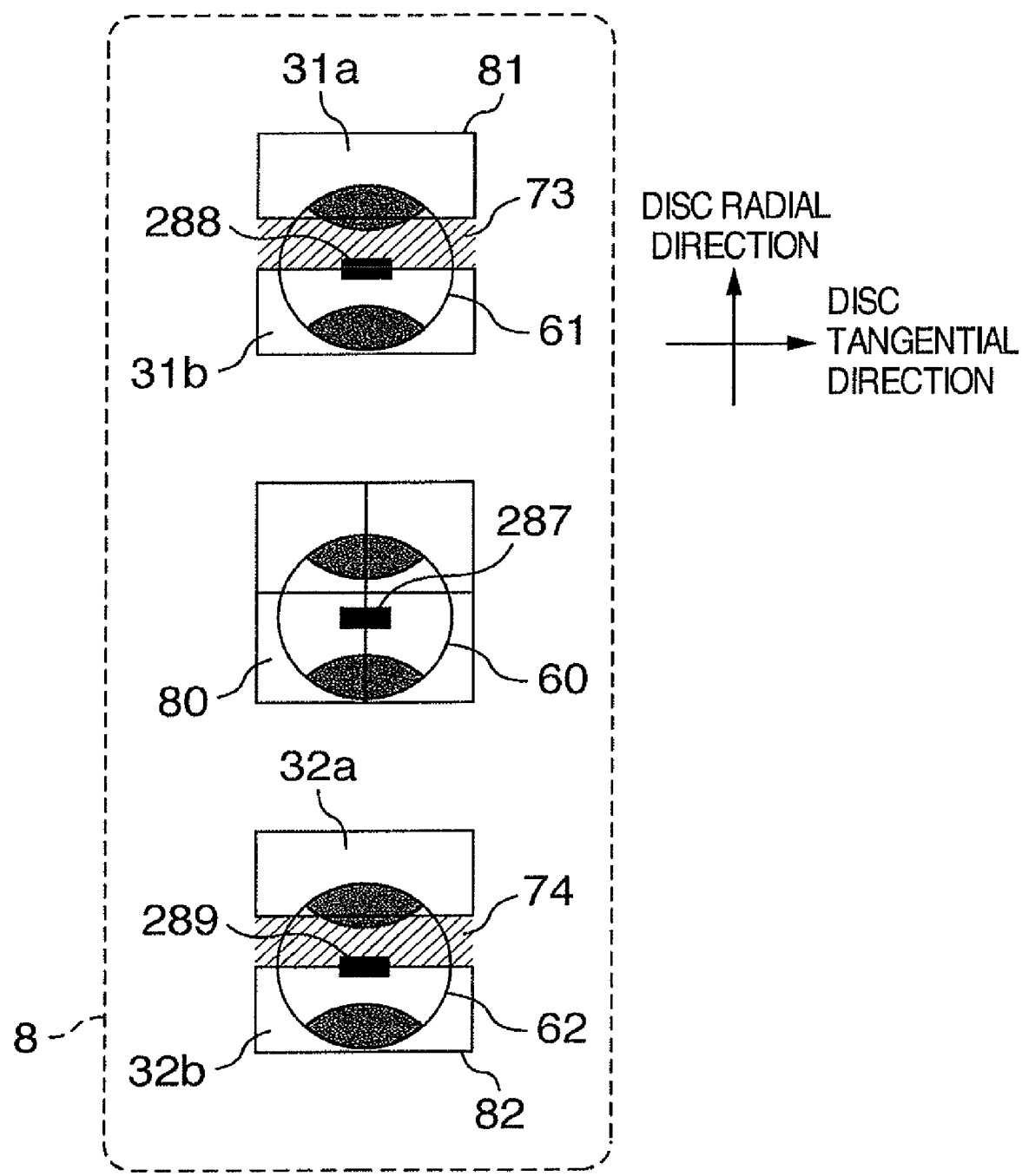
FIG. 20 is a schematic diagram showing a light intensity distribution of a signal optical beam on the photodetector when an objective lens is shifted.

When the objective lens shifts, the light intensity of signal optical beam is distributed on the photodetector schematically illustrated in FIG. 20. As the objective lens shifts in the radial direction of the optical disc, the main optical beam spot and the sub-optical beam spots move in a direction corresponding to the optical disc radial direction (up and down direction in the figure) on the photodetector plane. In case the objective lens shift amount causes the spot position as shown in FIG. 17 (in the case of the objective lens shift amount being small), a main optical beam dark portion 287 due to the optical element 13 is on the sectioning line representing the boundary between main PP signal detection divisional areas. On the other hand, since the sub-PP detection area on the light receiving plane for sub-optical beam differs in shape from the main PP detection area, each of the sub-optical beam dark portions 288 and 289 does not exist on the boundary between the sub-signal detection divisional areas. Accordingly, near the boundary, the sub-PP signal is more sensitive to the generation amount of offset due to the objective lens shift amount than the main PP signal.

Next, the case shown in FIG. 20 is considered where the objective lens shift amount is large and the main optical beam spot 60 and the sub-optical beam spots 61 and 62 are positioned as shown in FIG. 20 on the photodetector 8. This demonstrates an instance where the objective lens shift amount is large and so the moving amounts of the spots on the detector plane are also large. In this case, the main optical beam dark portion does not exist on the main PP detection area boundary but conversely, the sub-optical beam dark portion exists on the sub-PP detection divisional area boundary. Accordingly, near the boundary, the main PP signal is more sensitive to the generation amount of offset due to the objective lens shift amount than the sub-PP signal.

Thus, the visual field characteristics differ for the main PP and sub-PP over the whole area of objective lens shift and a large offset is generated in the tacking control signal based on the DPP scheme. Such an offset of the tracking control signal generates de-track to make the stable and highly accurate tracking control difficult.

In the present embodiment, by dividing the main optical beam light receiving plane into eight divisions, an extreme degradation in the tracking control signal at the time of objective lens shift can be cured. From the respective divisional light receiving planes, currents are generated in accordance with incident light intensities, converted independently by current/voltage conversion amplifiers 201 to 208 and those 270 to 273 and then subjected to an arithmetic operation process so that a focus control signal and a tracking control signal may be outputted. The main optical beam light receiving plane 80 is divided into divisional areas 80a, 80b, 80c, 80d, 80e, 80f, 80g and 80h as shown in FIGS. 19A and 19B and light quantity signals obtained from the respective divisional areas are A, B, C, D, E, F, G and H. Each of the sub-optical beam light receiving planes 81 and 82 is divided into divisional areas 31a, 31b and 32a, 32b and light quantity signals obtained from the respective divisional areas are I, J and K, L. An example of each of the focus control signal and tracking control signal will be described below. The focus control signal based on the astigmatism method can be obtained by calculating equation (5):

$$FES:[(A+E)+(C+G)]-[(B+F)+(D+H)] \quad (5)$$

In the present embodiment, however, the focus control signal detection method is not limited to the astigmatism method, either and another method such as the knife edge method may be used.

The RF signal can be obtained by calculating equation (6):

$$RF\text{-}SUM:A+B+C+D+E+F+G+H \quad (6)$$

The tracking control signal based on the DPP scheme can be obtained by calculating equation (7):

$$TES(DPP): [(A+E)+(B+F)]-(C+G)-(D+H)]-k2[(I-J)+(K-L)] \quad (7)$$

and the tracking control signal based on the DPD scheme can be obtained by comparing phases of two signals indicated by equation (8) by means of the phase comparator 268:

$$TES(DPD):[(A+E)+(C+G)],[(B+F)+(D+H)] \quad (8)$$

Figure 21:
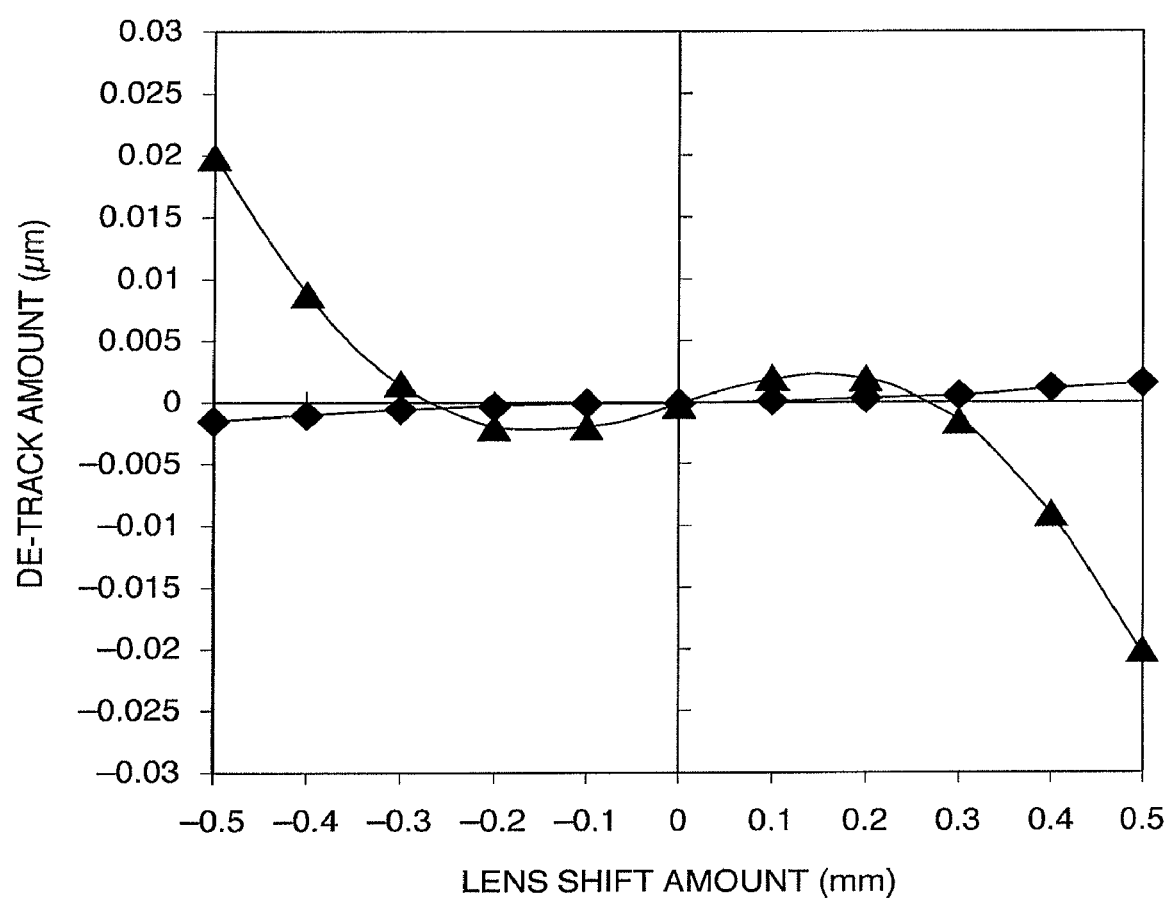
FIG. 21 is a graph showing simulation results of amounts of de-track generation in relation to the objective lens shift in the sixth and seventh embodiments.

At the time of the tracking control based on the DPP scheme, a de-track is caused as the objective lens shifts in the sixth and seventh embodiments and the amount of de-track can be estimated as graphically depicted in FIG. 21. In the sixth embodiment, the objective lens shift is accompanied by a large de-track. On the other hand, in the seventh embodiment, the objective lens shift is constantly accompanied by a small de-track amount and it will be seen that an excellent tracking control signal can be detected.

At that time, by making the spacing T between the newly provided sectioning lines 91 and 92 substantially equal to the width W of the light shielding zone or dead zone in the sixth embodiment, the objective lens visual field characteristics can be improved most efficiently.

In other words, in the present embodiment, by using the main optical beam light receiving plane which is divided into eight divisional areas by a single sectioning line substantially parallel to a direction corresponding to the radial direction of the optical disc and by three sectioning lines substantially vertical to the radial direction (first, second and third sectioning lines), suppression of interlayer cross talk substantially equal to that in the sixth embodiment and focus error signal detection can be assured and besides, by suppressing an offset of the tracking control signal based on the DPP scheme as the objective lens shifts, a stable tracking control signal can be detected highly accurately.

Embodiment 8

Figure 22:
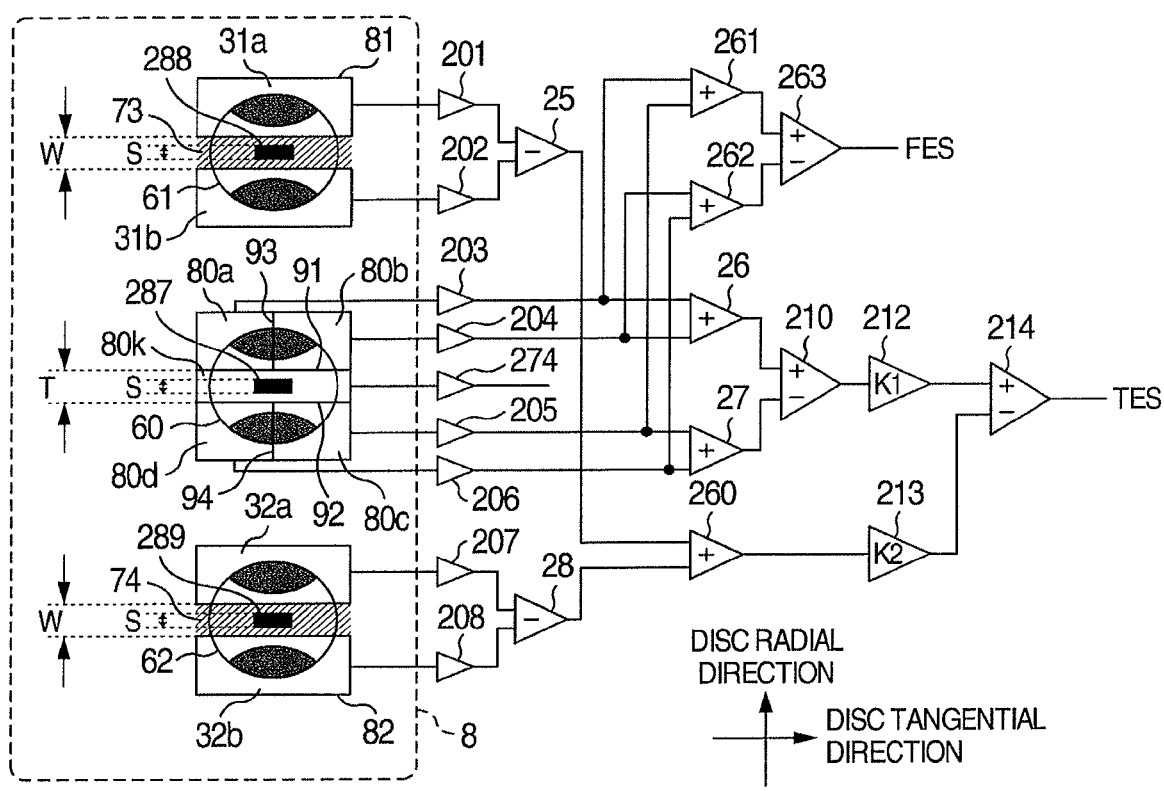
FIG. 22 is a schematic plan view diagram showing a photodetector representing a main part in an eighth embodiment.

Referring now to FIG. 22, an eighth embodiment will be described. FIG. 22 is a schematic diagram showing a photodetector representing a principle part of the eighth embodiment. The optical system configuration of an optical pickup apparatus in the present embodiment may be similar to that of the optical pickup apparatus shown in, for example, FIG. 12. The photodetector 8 shown in FIG. 22, however, has a light receiving plane pattern different from that shown in FIG. 12.

The main optical beam light receiving plane is first divided into three divisions by two sectioning lines 91 and 92 which are substantially vertical to a direction corresponding to the radial direction of the optical disc and excepting a central division area 80k, the remaining two of the three divisional areas the light receiving plane has are halved, respectively, by sectioning lines 93 and 94 substantially parallel to the direction corresponding to the radial direction of the optical disc, so that the light receiving plane is divided into 5 divisions in total.

In the present embodiment, by dividing the main optical beam light receiving plane into the 5 divisional areas, the degradation in the tracking control signal at the time of the objective lens shift can be cured sufficiently. Signals are outputted from the respective divisional areas in accordance with light intensities incident thereon and subjected to an arithmetic operation process to be described later so that a focus control signal and a tracking control signal may be outputted. The main optical beam light receiving plane 80 is divided into divisional areas 80a, 80b, 80c, 80d and 80k as shown in FIG. 22 and light quantity signals obtained from the respective divisional areas are A, B, C, D and M. The respective sub-optical beam light receiving areas are divided into divisional areas 31a and 31b and divisional areas 32a and 32b and light quantity signals obtained from the respective divisional areas are I, J and K, L. Examples of focus control signal and tracking control signal will be described below. The focus control signal based on the astigmatism method can be obtained by calculating equation (9):

$$FES:(A+C)-(B+D) \tag{9}$$

The focus control signal detection method in the present embodiment is not limited to the astigmatism method but may be based on another method such as knife edge method.

The RF signal can be obtained by calculating equation (10):

$$RF\text{-}SUM:A+B+C+D+M \tag{10}$$

The tracking control signal based on the DPP scheme can be obtained by calculating equation (11):

$$TES(DPP):[(A+B)-(C+D)]-k2[I-J)+(K-L)] \tag{11}$$

In the present embodiment, interlayer cross talk suppressive effect and objective lens visual field characteristic improving effect comparable to those in the seventh embodiment can be obtained. Further, because the main optical beam light receiving plane is divided by a less number than the seventh embodiment, the present embodiment is advantageous over the seventh embodiment in that the number of amplifiers can be reduced and a low noise photodetector can be provided. By setting the spacing T between the sectioning lines 91 and 92 on the main optical beam light receiving plane substantially equally to the minor side width W of the light shielding zone or dead zone, the objective lens visual field characteristics can be improved most efficiently.

Namely, in the present embodiment, by using the main optical beam light receiving plane which is divided into three divisions by two sectioning lines substantially vertical to a direction corresponding to the radial direction of the optical disc (first and third sectioning lines), with each of the remaining two divisional areas excluding the central divisional area of the three divisional areas halved by a single sectioning line substantially parallel to the radial direction of the optical disc so that the main optical beam light receiving plane can be divided into five divisions in total, the interlayer cross talk suppression effect and the objective lens visual field characteristic improving effect comparable to those in the seventh embodiment can be obtained and besides, a photodetector of lower noise than the photodetector of the seventh embodiment can be provided.

Embodiment 9

Figure 23:
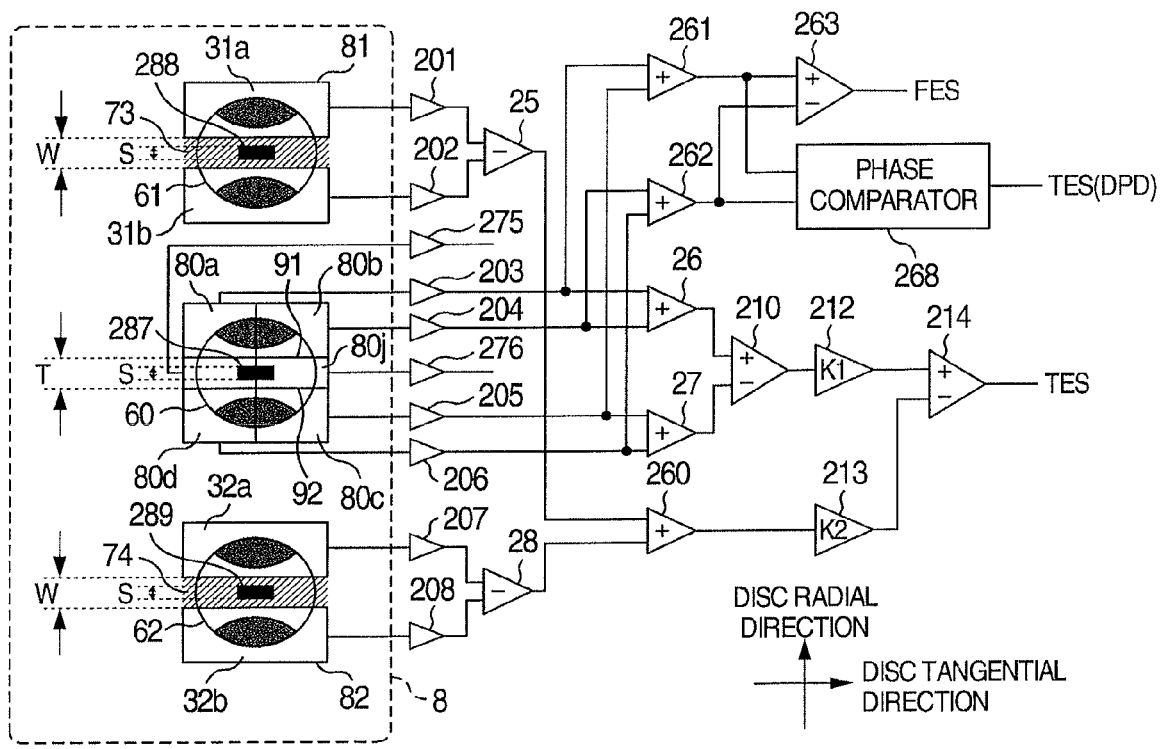
FIG. 23 is a schematic plan view diagram showing a photodetector representing a main part in a ninth embodiment.

Next, a ninth embodiment will be described with reference to FIG. 23. FIG. 23 is a schematic diagram showing a photodetector representing a principle part of the ninth embodiment. The optical system configuration of an optical pickup apparatus in the present embodiment may be similar to that of the optical pickup apparatus shown in, for example, FIG. 12. The photodetector 8 shown in FIG. 23, however, has a light receiving plane pattern different from that shown in FIG. 12. The main optical beam light receiving plane is divided into six divisions by two sectioning lines 91 and 92 which are substantially vertical to a direction corresponding to the radial direction of the optical disc and by a single sectioning line substantially parallel to the direction corresponding to the radial direction of the optical disc.

In the present embodiment, by dividing the main optical beam light receiving plane into the 6 divisional areas, the degradation in the tracking control signal at the time of the objective lens shift can be cured drastically. Signals are outputted from the respective divisional areas in accordance with light intensities incident thereon and then are subjected to an arithmetic operation process to be described later so that a focus control signal and a tracking control signal may be outputted. The main optical beam light receiving plane 80 is divided into divisional areas 80a, 80b, 80c, 80d, 80i and 80j as shown in FIG. 23 and light quantity signals obtained from the respective divisional areas are A, B, C, D, N and O. The respective sub-optical beam light receiving areas 81 and 82 are divided by divisional areas 31a and 31b and divisional areas 32a and 32b and light quantity signals obtained from the respective divisional areas are designated by I, J and K, L. Examples of focus control signal and tracking control signal will be described below. The focus control signal based on the astigmatism method can be obtained by calculating equation (12):

$$FES:(A+C)-(B+D) \tag{12}$$

The focus control signal detection method in the present embodiment is not limited to the astigmatism method but may be based on another method such as knife edge method.

The RF signal can be obtained by calculating equation (13):

$$RF\text{-}SUM: A+B+C+D+N+O \tag{13}$$

The tracking control signal based on the DPP scheme can be obtained by calculating equation (14):

$$TES(DPP):[(A+B)-(C+D)]-k2[(I-J)+(K-L)] \tag{14}$$

The tracking control signal based on the DPD scheme can be obtained by adding output signals N and O from current/voltage conversion amplifiers 275 and 276 pursuant to equation (15) or (16):

$$TES(DPD):(A+C+N),(B+D+O) \tag{15}$$

$$TES(DPD):(A+C+O),(B+D+N) \tag{16}$$

One of the operations as above is executed selectively depending on a positional shift of the photodetector in a direction corresponding to the radial direction of the optical disc and by comparing phases of the respective signals by means of the phase comparator 268, so that a tracking control signal based on the DPD scheme of lower noise than in the seventh embodiment and of higher accuracy than in the eighth embodiment can be generated to advantage.

Advantageously, in the present embodiment, the interlayer cross talk suppressive effect and objective lens visual field characteristic improving effect comparable to those in the eighth embodiment can be obtained and besides the DPD signal detection can be done more accurately than in the eighth embodiment. By setting the spacing T between the sectioning lines 91 and 92 on the main optical beam light receiving plane substantially equally to the minor side width W of the light shielding zone or dead zone, the objective lens visual field characteristics can be improved most efficiently.

Namely, in the present embodiment, by using the main optical beam light receiving plane which is divided into six divisions by two sectioning lines substantially vertical to a direction corresponding to the radial direction of the optical disc (first and third sectioning lines) and by a single sectioning line substantially parallel to the direction corresponding to the radial direction of the optical disc, the interlayer cross talk suppression effect, objective lens visual field characteristic improving effect and noise level comparable to those in the eighth embodiment can be obtained and besides, the accuracy of detection of a DPD signal can be improved to advantage.

Embodiment 10

Next, a tenth embodiment will be described with reference to FIG. 24. The optical system configuration of an optical pickup apparatus in the present embodiment may be similar to that of the optical pickup apparatus shown in, for example, FIG. 12. In the present embodiment, mount or dismount of the optical element 13 does not matter.

Figure 24:
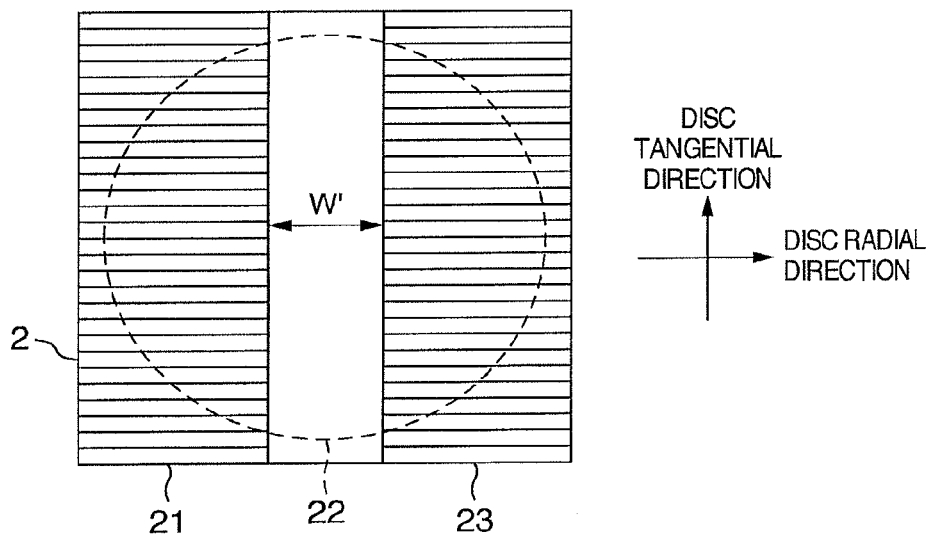
FIG. 24 is a schematic diagram showing the shape of a diffraction grating representing a main part in a tenth embodiment.

FIG. 24 is a schematic diagram showing the shape of a diffraction grating 2 representing a principal part of the present embodiment. The diffraction grating is divided into three divisional areas by at least two sectioning lines substantially vertical to a direction corresponding to the radial direction of the optical disc and of the three areas, excepting a central area 22, only areas 21 and 23 have each grating grooves extending in a direction substantially vertical to the two sectioning lines at a predetermined period, thus providing diffraction grating. Then, the central area 22 may be transparent and flat.

Figure 25:
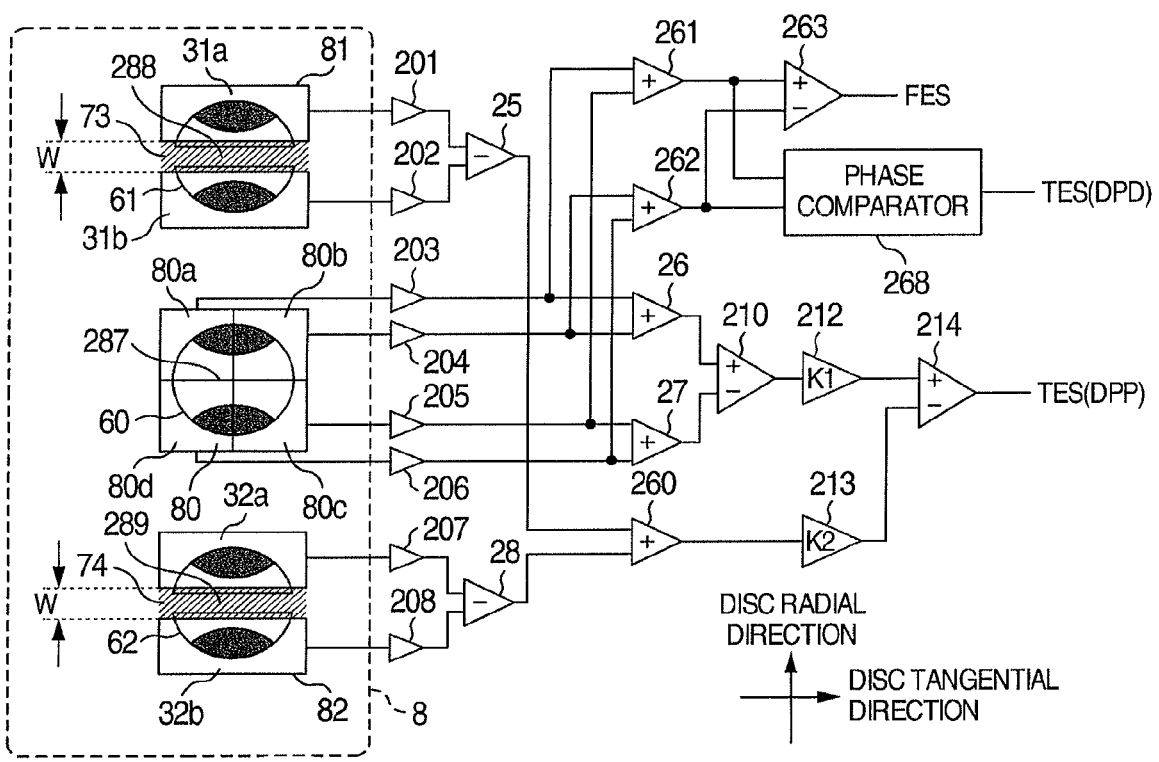
FIG. 25 is a schematic plan view diagram showing a photodetector and the shape of a spot of individual optical beams in the tenth embodiment.

FIG. 25 shows a photodetector 8 used in the present embodiment and individual optical beam spots on the photodetector. When a laser beam lands on the diffraction grating of this embodiment, a sub-optical beam is generated which does not substantially have light quantity at the central strip zone because only the central area does not have the function to diffract.

The present inventors have examined the trisected diffraction grating and found it having larger suppression effect than that obtained when the general diffraction grating without divisional areas is applied.

Also, in the present embodiment, the optical element 13 and ¼ wavelength plate 14 are not mounted in the actuator 6. Accordingly, the actuator can be reduced in weight and excellent servo characteristics can be obtained to advantage. Because of disuse of the optical element 13, no dark portion 287 exists in the main optical beam spot and a more excellent jitter value than that in embodiment 6 can be obtained.

Namely, in the present embodiment, by using, as a beam splitting element, the diffraction grating structure which is formed with grating grooves arranged at a predetermined period in a direction corresponding to a direction substantially parallel to the radial direction of the optical disc or the diffraction grating structure which is divided, by at least two sectioning lines substantially vertical to the direction corresponding to the radial direction of the optical disc, into three areas of which only right and left two areas excepting a central area are each formed with the grating grooves arranged at a predetermined period and extending in a direction substantially vertical to the two sectioning lines, the actuator can be reduced in weight, excellent servo characteristics can be obtained and besides, because of elimination of a dark portion due to the optical element 13 from the main optical beam spot, an excellent jitter value can be obtained to advantage.

Embodiment 11

Figure 26:
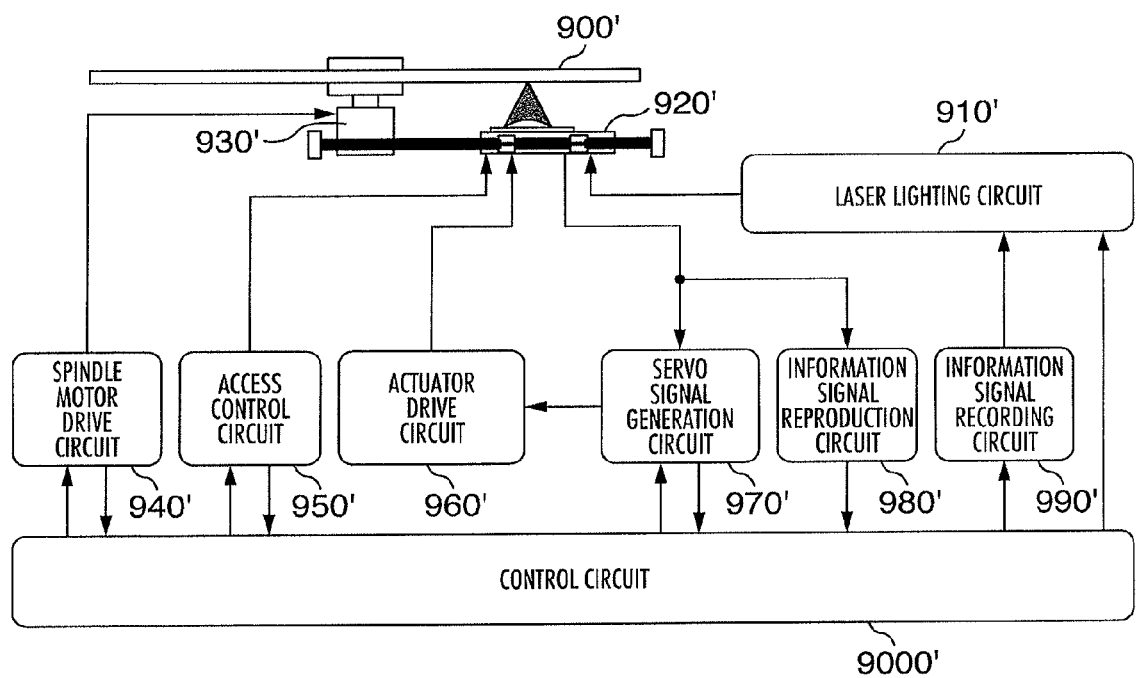
FIG. 26 is a schematic diagram showing an example of an optical disc apparatus mounting the optical pickup apparatus according to the invention.

Referring to FIG. 26, an optical disc apparatus mounting the optical pickup apparatus according to the sixth to tenth embodiments is illustrated in schematic diagram form. The optical disc apparatus comprises an optical disc 900', a laser lighting circuit 910', an optical pickup apparatus 920', a spindle motor 930', a spindle motor drive circuit 940', an access control circuit 950', an actuator drive circuit 960', a servo signal generation circuit 970', an information signal reproduction circuit 980', an information signal recording circuit 990' and a control circuit 9000'. Responsive to an output from the optical pickup 920', the control circuit 9000', servo signal generation circuit 970' and actuator drive circuit 960' control an actuator. By using, for actuator control, the output from the optical pickup apparatus according to the present invention, stable and highly accurate information recording and information reproduction can be attained.

Obviously, the optical pickup apparatus using the present invention is not limited to the optical system shown in FIG. 12 and the optical system configuration or light receiving plane structure explained in connection with the embodiments.

Through the use of the components as above, when reproducing an information signal from an optical disc having a recording layer of multi-layer structure or recording an information signal on the recording layer, the degradation in quality of a tracking control signal caused by the interference of an unwanted optical beam stemming from a recording layer other than a target layer for reproduction or recording with an essential signal optical beam can be cured sufficiently and a stable and highly accurate tracking control signal can be detected.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical pickup comprising:
    a semiconductor laser light source;
    a beam splitting element having the function to split a laser optical beam emitted from said semiconductor laser light source into a main optical beam and sub-optical beams;
    an objective lens for focusing the main optical beam and each of the sub-optical beams on a predetermined recording layer provided in an optical information recording medium; and
    a photodetector for independently receiving reflections of the main optical beam and sub-optical beams from said recording layer to detect predetermined signals,
    wherein the photodetector includes a light receiving plane for main optical beam on which the main optical beam is incident and which is divided into four divisional areas by two mutually substantially orthogonal sectioning lines; and light receiving planes for sub-optical beams on which the sub-optical beams are incident and each of which is divided into four divisional areas by two mutually substantially orthogonal sectioning lines and being capable of detecting a focus control signal based on an astigmatism scheme
    wherein the light receiving planes for sub-optical beams each further includes a strip-shaped light shielding zone provided on and near any of the two sectioning lines provided for the light receiving plane for sub-optical beams and having a predetermined width and substantially completely blocking the incident light, and
    wherein the light shielding zone has a wavelength-selectability which exhibits a different transmission factor in accordance a wavelength band of the laser optical beam such that the transmission factor becomes substantially zero for a predetermined wavelength band of the laser optical beam.

2. The optical pickup according to claim 1, wherein the light shielding zone provided in each of the light receiving planes for sub-optical beams has a minor side width amounting to a value within a range of 20% to 40% of the diameter of a focused light spot of the sub-optical beam irradiated on each of the light receiving areas for sub-optical beams.

3. An optical information reproduction apparatus, comprising:
    an optical pickup according to claim 2, and
        a function of detecting a tracking control signal based on a differential push-pull system by independently detecting predetermined signals based on the push-pull system from respective ones of the light receiving plane for main optical beam and light receiving planes for sub-optical beams and subjecting detected signals to a predetermined arithmetic processing.

4. The optical pickup apparatus according to claim 1, wherein the light shielding zone provided in each of the light receiving planes for sub-optical beams has a minor side width amounting to a value within a range of 20 μm to 40 μm.

5. An optical information reproduction apparatus, comprising:
    an optical pickup according to claim 1, and
        a function of detecting a tracking control signal based on a differential push-pull system by independently detecting predetermined signals based on the push-pull system from respective ones of a light receiving plane for main optical beam and light receiving planes for sub-optical beams and subjecting detected signals to a predetermined arithmetic processing.

6. An optical pickup comprising:
    a semiconductor laser light source;
    a beam splitting element having the function to split a laser optical beam emitted from said semiconductor laser light source into a main optical beam and sub-optical beam;
    an objective lens for focusing the main optical beam and each of the sub-optical beams on a predetermined recording layer provided in an optical information recording medium; and
    a photodetector for independently receiving reflections of the main optical beam and sub-optical beams from said recording layer to detect predetermined signals,
    wherein the photodetector includes a light receiving plane for main optical beam on which the main optical beam is incident and which is divided into four divisional areas by two mutually substantially orthogonal sectioning lines; and light receiving planes for sub-optical beams on which the sub-optical beams are incident and each of which is divided into four divisional areas by two mutually substantially orthogonal sectioning lines and being capable of detecting a focus control signal based on an astigmatism scheme,
    wherein a strip-shaped region of a predetermined width is provided on and near any of the two sectioning lines provided for each of the light receiving planes for sub-optical beams, the strip-shaped region being constituted of a dead zone having substantially zero current or voltage-output sensitivity to the intensity of the incident light, and
    wherein the dead zone has a wavelength-selectability which exhibits a different transmission factor in accordance with a wavelength of the laser optical beam such that the transmission factor becomes substantially zero for a predetermined wavelength band of the laser optical beam.

7. The optical pickup according to claim 6, wherein the dead zone provided in each of the light receiving planes for sub-optical beams has a minor side width amounting to a value within a range of 20% to 40% of the diameter of a focused light spot of the sub-optical beam irradiated on each of the light receiving areas for sub-optical beams.

8. The optical pickup apparatus according to claim 6, wherein the dead zone provided in each of the light receiving planes for sub-optical beams has a minor side width amounting to a value within a range of 20 μm to 40 μm.

* * * * *